(12) United States Patent
Pacey et al.

(10) Patent No.: US 9,895,612 B2
(45) Date of Patent: Feb. 20, 2018

(54) PLATFORM FOR ASSOCIATING CHARACTERISTICS OF A DIGITAL ASSET WITH MULTIPLE MEDIA SOURCES

(71) Applicants: Larry Pacey, Northbrook, IL (US); Brian Booker, Woodland Hills, CA (US)

(72) Inventors: Larry Pacey, Northbrook, IL (US); Brian Booker, Woodland Hills, CA (US)

(73) Assignee: PARTICLE CITY, INC., Chatsworth, CA (US)

( * ) Notice: Subject to any disclaimer, the term of this patent is extended or adjusted under 35 U.S.C. 154(b) by 681 days.

(21) Appl. No.: 14/333,359

(22) Filed: Jul. 16, 2014

(65) Prior Publication Data
US 2015/0024852 A1    Jan. 22, 2015

Related U.S. Application Data

(60) Provisional application No. 61/846,864, filed on Jul. 16, 2013.

(51) Int. Cl.
*A63F 13/58* (2014.01)
*A63F 13/67* (2014.01)
*A63F 13/69* (2014.01)

(52) U.S. Cl.
CPC .............. *A63F 13/67* (2014.09); *A63F 13/58* (2014.09); *A63F 13/69* (2014.09)

(58) Field of Classification Search
CPC .......... A63F 13/58; A63F 13/67; A63F 13/69; A63F 2300/65; A63F 2300/66
USPC .......................................................... 463/43
See application file for complete search history.

(56) References Cited

U.S. PATENT DOCUMENTS

| | | | | |
|---|---|---|---|---|
| 2007/0197274 | A1* | 8/2007 | Dugan | A63F 13/52 463/7 |
| 2008/0280684 | A1* | 11/2008 | McBride | A63F 13/12 463/42 |
| 2008/0287175 | A1* | 11/2008 | Kusuda | A63F 13/12 463/17 |
| 2010/0174593 | A1* | 7/2010 | Cao | A63F 13/12 705/14.12 |

* cited by examiner

*Primary Examiner* — Allen Chan
(74) *Attorney, Agent, or Firm* — Greer, Burns & Crain, Ltd.

(57) ABSTRACT

A method for managing a stored digital asset on one or more computers independently of a plurality of media sources. The digital asset includes a plurality of characteristics including at least one alterable characteristic, and includes one or more of a virtual character, virtual property, or a game asset. The method includes sending at least a first portion of the digital asset data to one or more of the media sources including at least one characteristic, whereby performance of media by the one or more media sources is affected by the at least one characteristic, receiving data from the one or more media sources for altering the at least one alterable characteristic, and altering the at least one alterable characteristic in the stored digital asset based on the received data.

32 Claims, 19 Drawing Sheets

PLATFORM FOR ASSOCIATING CHARACTERISTICS OF A DIGITAL ASSET WITH MULTIPLE MEDIA SOURCES

PRIORITY CLAIM AND REFERENCE TO RELATED APPLICATION

This application claims priority of U.S. Provisional Patent Application No. 61/846,864, filed Jul. 16, 2013, under 35 U.S.C. § 119.

FIELD OF THE INVENTION

A field of the invention is digital media. Example applications of the invention include apparatuses, methods, and systems for associating at least one characteristic of a digital asset with multiple media sources.

BACKGROUND OF THE INVENTION

It is common for consumers of digital entertainment provided in interactive or non-interactive media to engage with the media to a large degree, particularly with interactive media. An example of interactive media is video games. Consumers invest time and/or resources progressing through events in the interactive media. One example of this is development of a digital character or avatar (collectively referred to as a character) that is represented in a virtual universe provided by the interactive media. Such development can include customizing the appearance or likeness of the character, improving the characteristics of the character, including personal characteristics or accessories, or engaging in various events with the character. The consumer preferably can control the character in an interactive environment. This allows the character to be part of an interactive adventure, while characteristics of the character are improved as the adventure progresses. Examples of such virtual universes include both offline and online universes.

Some recent characters in virtual universes have been associated with real-world objects that include interactive devices such as RFID, USB, or a digital code (e.g., numeric, bar codes, etc.) for providing a relationship between the real-world object and the interactive media. An example of systems that include such real-world objects and associated interactive media is the Skylanders™ system. Another example is the Webkins™ line of interactive toys. Systems that allow a consumer to invest in a character are increasingly popular.

SUMMARY OF THE INVENTION

An embodiment of the invention provides, among other things, a method for managing a stored digital asset on one or more computers independently of a plurality of media sources. The digital asset comprises a plurality of characteristics including at least one alterable characteristic, and comprises one or more of a virtual character, virtual property, or a game asset. The method includes sending at least a portion of the digital asset data to one or more of the media sources including at least one characteristic, whereby performance of media by the one or more media sources is affected by the at least one characteristic, receiving data from one or more of the media sources for altering the at least one alterable characteristic, and altering, by the one or more computers, the at least one alterable characteristic in the stored digital asset based on the received data.

Another embodiment of the invention provides, among other things, a method for managing a plurality of digital assets on one or more computers independently of a plurality of media sources, including first and second media sources. Each of the digital assets can include one or more of a virtual character or virtual property and is represented by digital asset data. The digital asset data includes a plurality of characteristics including at least one alterable characteristic. An example method includes enabling a user to access at least a portion of the digital asset data for at least one of the plurality of digital assets, and providing the accessed digital asset data to each of the first and second media sources. Performance of media by the first and second media sources is affected by the accessed digital asset data.

Another embodiment of the present invention provides, among other things, a method for managing a plurality of game states. Each of the game states is associated with games hosted on a media source. Each of the game states is represented by digital asset data. The game state for a first game is provided to a first media source, enabling a user to access the first game on the first media source. The provided game state for the first game alters performance of the first game, and performance of the first game alters the game state for the first game. At least a portion of the game state for a second game on a second media source is altered based on the altered game state for the first game. The altered game state for the second game is provided to the second media source, wherein the provided game state for the second game alters performance of the second game.

Another embodiment of the present invention provides, among other things, a method for managing a plurality of game states. Each of the game states is associated with games hosted on a media source, and each of the game states is represented by digital asset data. A user interface is provided that is accessible to a plurality of users. The plurality of users are enabled to form a guild via the user interface. The guild is associated with one or more characteristics. Access is enabled for the users in the guild to a first game and a second game. A game state for the first game and the second game is altered for each of the users of the guild based on the one or more characteristics.

Another embodiment of the invention provides, among other things, an apparatus for facilitating performance of media by a plurality of media sources. The apparatus includes at least one computer networked with the plurality of media sources. The at least one computer includes a database storing a plurality of digital assets, where each digital asset includes digital asset data comprising identification information, user information, and a plurality of characteristics including alterable characteristics; an interface configured to receive requests and identification information from each of the plurality of media sources, send digital asset data to one or more of the plurality of media sources, and receive data from one or more media sources for altering one or more alterable characteristics; and a processor configured to retrieve digital asset data in response to the requests and identification information for sending via the interface, and configured to alter the one or more alterable characteristics in response to the received data.

Yet another embodiment of the invention provides, among other things, an apparatus for delivering a customized movie to a user. The apparatus includes at least one computer in communication with the user. The at least one computer includes a database storing video content, where the video content includes predetermined content that is affected by characteristics of digital asset data that is maintained independently of the video content; an interface for accessing the characteristics; a processor for configuring or altering the video content in response to the accessed characteristics; and a user interface configured for receiving a request for video content from the user, and for sending the configured or altered video content to the user as the customized movie.

Another embodiment of the invention provides, among other things, a method of facilitating customization of media for a plurality of media sources. A digital asset is provided in at least one computer that is maintained independently of any of the plurality of media sources, where the digital asset includes digital asset data including identification information, user information, and characteristics including alterable characteristics. The digital asset data is provided to the plurality of media sources, whereby performance of media by each of the plurality of media sources is affected by the digital asset data. Data from the one or more media sources is received for altering one or more alterable characteristics. The one or more alterable characteristics are altered based on the received data. A fee is charged for one or more of providing the digital asset data or altering the one or more alterable characteristics.

BRIEF DESCRIPTION OF THE DRAWINGS

FIG. 5A shows a first figurine and a virtual character with the movie associated with the first figurine, FIG. 5B shows a second figurine and a virtual character associated with the second figurine, FIG. 5C shows an event during the movie, and FIG. 5D shown characteristics for the second virtual character;

DETAILED DESCRIPTION

Figure 1:
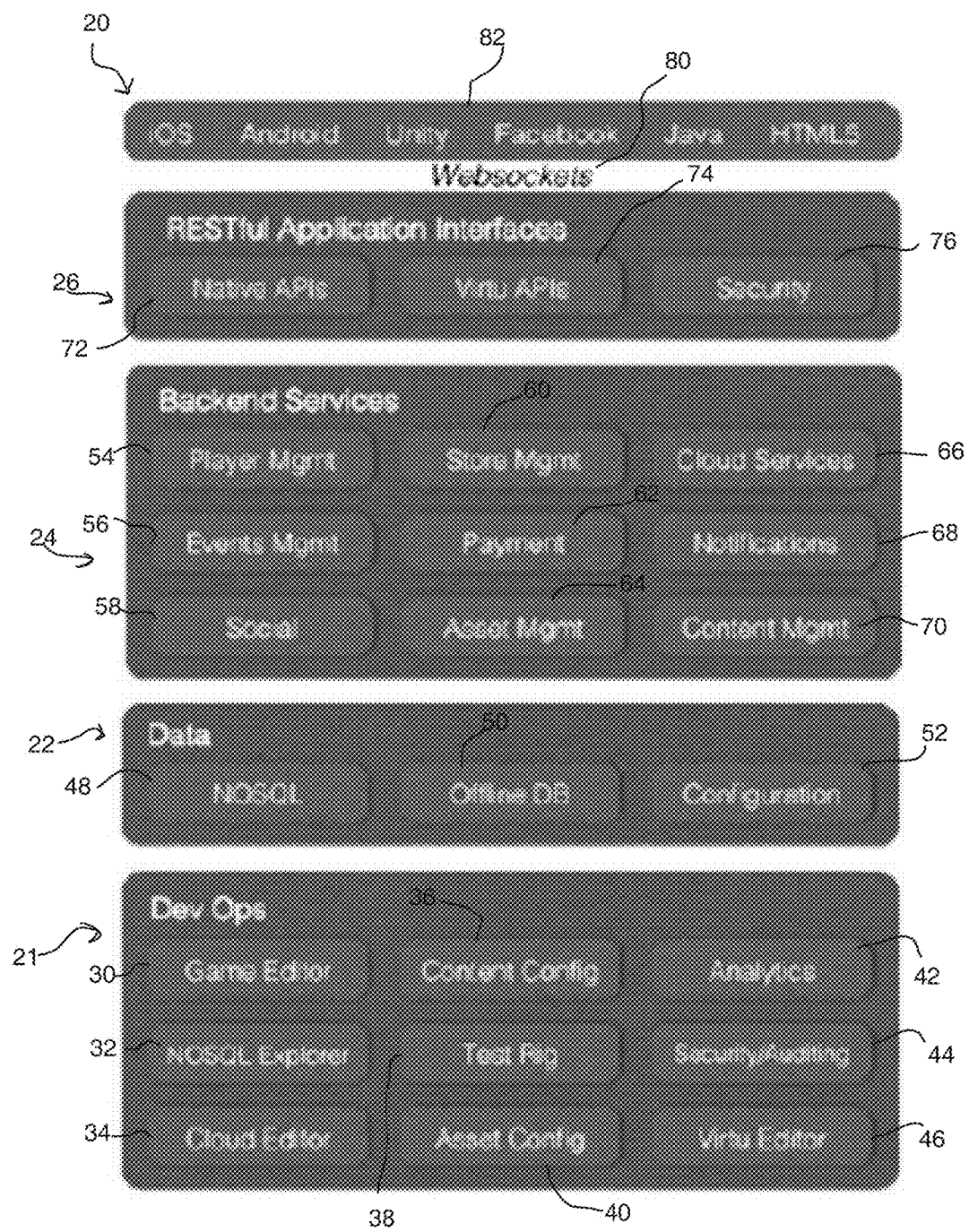
FIG. 1 shows a technology stack for an example digital platform infrastructure according to an embodiment of the invention.

Despite the popularity of gaming or other interactive systems in the aggregate, the popularity of an individual one of these systems can gradually decrease or even quickly vanish as consumers move onto another character or virtual universe. Significant resources are required to set up, maintain, and advertise such systems, but fickle consumers can quickly and easily abandon their previous time/money investment. A business model thus requires large resources, both upfront and continuing, but with the likelihood and even inevitability that consumers will quickly follow a new trend, resources are soon wasted. Goodwill and branding usually do not alleviate this problem, as brands rarely translate beyond their original successes. Today, entertainment publishers suffer from a business model where their consumers are fickle and quick to follow new trends.

The consumer also feels a loss of investment. A consumer can spend large amounts of time and money investing in a character only to lose all progress with each new virtual universe. Video game players, for instance, are presented with a sea of new products for purchase, but the progress gained in one title is lost with each new game they play. While there have been some small steps toward carrying over characteristics from a game to its sequels in the same virtual universe or intellectual property (IP) universe (e.g., sequels for the same title), there has not been a similar carryover between different virtual universes. Further, such characteristics have been managed within the games themselves, and not independently of such games.

This problem also exists with game states. A consumer may spend hundreds or even thousands of hours engaged with several games, changing a state of each of the games throughout game play. However, the game state of a particular game remains independent of that of other games. While more recently data representing occurrence of certain events from a game can be transferred to a different game in the same IP universe to affect a game state of the latter game, this is believed to currently only occur in a single direction. Also, such data has remained within the particular game universe, and further has not been stored, maintained, or managed independently of such games.

Additionally, other types of media, such as non-interactive media, to date have been left out of this new, on-demand universe. For example, while certain characters can have a presence in a particular virtual universe, with characteristics that can be changed by user interactivity, and other, unrelated instances of these "same" characters can have a presence in a medium such as video, there has been no association between these characters.

Before describing particular inventive aspects, it will be appreciated that the present invention may be embodied in a method, system, and/or computer program product. For example, a method according to one embodiment may be carried out by one or more entities using computers or by one or more computers executing steps of the invention, and a program product of the system may include computer executable instructions that when executed by one or more computers cause one or more computers to carry out steps of a method of the invention. The program instructions of embodiments of the invention may be stored on one or more computer readable media (such as a transitory, volatile, non-transitory or non-volatile memory medium, with examples including magnetic, optical, electrical, chemical, and the like), and may cause results of computations to be stored in one or more memories and/or to be displayed on displays.

"Computers" as contemplated by the invention are to be broadly interpreted, and include, for instance, processor based devices of all sizes and configurations, including servers, personal computers (PCs), desktop computers, dedicated terminals, smart televisions, game consoles, and mobile devices such as laptops, tablets, portable communication devices (including but not limited to smart phones), wearable devices, portable gaming and entertainment devices, kiosks, or any other suitable computer or processor that is suitably configured to perform methods, any portions of methods, or environments for any methods, according to the invention. Computers can be accessed via direct links, indirect links, wired or wireless links, browsers, etc. Computers can include groups of linked computers, linked either directly or via a network. A network can refer to one or multiple linked networks. It will be appreciated that descriptions of example methods herein can be applied to example apparatuses and systems, and vice versa.

An example computer further includes memory (e.g., random access memory (RAM) and/or read-only memory (ROM)), storage (e.g., non-volatile storage, disk drive storage, etc.), and can further include one or more media readers for reading non-transitory computer readable media. Suitable input/output devices (e.g., displays, keyboards, mice, touch screens, controllers, etc.) can be used for interfacing with the computer. One or more network interfaces for networks, e.g., for local area network ("LAN"), wide area network ("WAN"), mobile network, Internet, etc., whether secured or unsecured, is provided for accessing and interfacing with one or more networks. A suitable bus (not shown) may be used for communication of the various computer components as will be appreciated in the art.

"Receiving," "sending," or "providing" can include direct or indirect receiving, sending, or providing, and can include direct receiving, sending, or providing of data needed to perform one or more example methods. Example embodiments can be secure and web based, and digital platforms according to such embodiments can be administered via cloud and/or by a server/client arrangement, or any other suitable network arrangement, using any suitable method and arrangement as appreciated by those of ordinary skill in the art. "Enabling" is intended to broadly refer to allowing, equipping, or providing access for an entity (such as, but not limited to, a user) to perform an action, or giving an entity authority or capability to perform an action.

Embodiments of the invention provide, among other things, a digital platform for associating at least one characteristic of a digital asset with multiple media sources. Preferably, such a digital asset exists independently of the media sources.

Media can be provided by various media channels, including both interactive and non-interactive media channels. Interactive media channels can include, but are not limited to, online games (including social media/games, online universes, role-playing games, and others), offline video games and interactive stories (audio, visual, or audio-visual), interactive toys, interactive advertising, applications, social media, etc. Non-interactive media channels can include, but are not limited to, video, non-interactive advertising, pictures, books, music, displays, non-interactive toys, etc. that can operate in some embodiments in whole or in part without any interactive response from, or in some embodiments without substantial interactive response from, a user. Some interactive media can include non-interactive portions, and vice versa. One non-limiting example includes videos having multiple branching paths that can be selected by actions of a user or by characteristics of a digital asset. Another non-limiting example includes a video game having non-interactive video portions. One particular example includes games having so-called quick-time events (QTE), in which actions taken by a user at particular times within an otherwise generally non-interactive video affect the video's performance.

Media sources include sources for providing such media, such as, but not limited to, personal computers, consoles, mobile devices, wearable devices, or other computers, storage devices, editable discs, non-editable disks, books (including e-books), etc. Computers (including personal computers, network devices, mobile communication devices, consoles, etc.) executing instructions contained on media can be considered media sources as well. A user's computer or other computer that provides media can also be considered a media source.

An example "digital asset" is a user asset represented digitally for one or more channels of media that exists independently of the media. Example digital assets include virtual characters and virtual property (e.g., items, accessories, clothing, buildings, vehicles, even towns/countries/worlds). Game states are other examples of digital assets.

The digital assets include asset data that represent characteristics of the digital asset. Characteristics include, but are not limited to, characteristics known in the art for video game characters, objects, or game states. Non-limiting particular examples include characteristics relating to abilities, interactive data such as strength, defense, intelligence, and boost effects in a modifying asset (e.g., extra defense), appearance, identification, location, history of activities, history of game universe events (including those in which the user has or has not participated), scores or achievements in a game, etc. Further examples are described and shown elsewhere herein. Other examples of digital asset data include, but are not limited to, original owner and ownership history. By contrast, characters, virtual property, game states, etc. have conventionally existed as part of a particular game or part of a service dedicated exclusively to that particular game.

In an embodiment of the invention, one or more of the digital asset characteristics can be associated with multiple media sources. "Associated with" can refer to at least one alterable characteristic of the digital asset being altered in response to activity by or other interaction with a media source. "Associated with" can alternatively or additionally refer to at least one characteristic (either alterable or non-alterable) influencing an operation of the media source.

Digital assets can be stored, for example, as instances of objects, one or more database fields, etc., on one or more computers, including servers, in any suitable manner. An example digital asset is stored on a database of a server, which can be networked or otherwise provided in communication with computers, such as (but not limited to) personal computers, handheld devices, tablet computers, smartphones, media players, arcade machines, game consoles, set-top boxes, cars, toys, displays, and others. However, such digital assets can be stored and maintained on any networked computing device that can exist independently of multiple media sources.

Digital assets can also be associated with real world items, such as objects (e.g., figurines, toys, books, computers, etc.), real world locations defined by objects (e.g., kiosks), geo-location coordinates (e.g., GPS, latitude/longitude, map grid location, etc.). Real world items can be purchased, acquired, loaned, rented, etc. In some example embodiments, digital asset data (all or a portion) can be exchanged among the real-world objects themselves. Real world locations can be located, traveled to, and/or engaged by real-world objects, and user locations can be used to alter or create digital assets independently of proprietary real-world objects. Users can have one or more of a particular asset in use at a time in the media and/or in provided real world items, e.g., a party of characters, a character and one or more items, virtual properties, or any combination.

Associating characteristics of a digital asset with multiple media sources allows developers and consumers to interact with digital assets among the media sources to create experiences that are not possible with existing platforms. By allowing characteristics to be associated with multiple media sources, the digital asset can be part of a multiverse linked by intermediary computers, e.g., via one or more, or a suite of, cloud services. By contrast, conventional digital assets typically are supported by a single universe, or store particular information only locally (e.g., in a particular game save file, or in storage within a toy). "Cloud" or "cloud services" is to be interpreted broadly, and includes, e.g., services and information provided by shared computing resources, including software and hardware, interconnected via network (e.g., LAN, WAN, internet, intranet, VPN, personal area network, etc.)

By providing and managing digital assets that are independent of a particular media and/or virtual universe, the digital asset can be applied across various media or across a multiverse. For instance, a consumer can accumulate game assets that are available independently of any one game or game universe. This allows a user to invest time and/or money in the digital asset and receive benefits across multiple media sources. Such digital assets may be, in whole or part, created, altered, combined, split, purchased, auctioned, traded, pooled, gifted or donated, reviewed, etc. Providing such independent digital assets also discourages users from walking away from their investments, for instance when newer virtual universes or media are made available. Creators of new media derive benefit from being associated with the digital asset as well.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

An embodiment of the invention includes a digital platform embodied in a cloud service including one or more computers storing one or more digital assets in a database, with appropriate storing, processing, and networking devices, as will be appreciated by those of ordinary skill in the art. Such computers preferably are remote from but in communication with (e.g., networked with or otherwise interfaced with) multiple media sources, so that the digital platform including the stored digital asset can exist independently of any or preferably all of the media sources, but can supply (directly or indirectly) data related to the digital asset to any of the media sources. The digital asset data can affect performance of particular media. Preferably, the one or more computers also can receive (directly or indirectly) data from any of the media sources for altering characteristics of the digital asset.

As a non-limiting example, a digital platform can include a server infrastructure providing a server back-end, and a client application, such as but not limited to, a portal (including web portals or other suitable portals accessible by personal computers, consoles, portable devices, mobile communication devices (including portals via applications (apps), etc.)), which provides an interface enabling communication with client computers and ties users into the digital platform.

An example digital platform server infrastructure includes a cloud-based system and standardized application interface (API) solution optimized for management of serialized digital assets integrated with real-time applications. Serialized digital assets provide, for example, unique asset tracking and analytics. However, non-serialized digital assets can also be managed. The digital platform can be networked with media networks engaged in digital content distribution, communication companies, consumer/retail networks, and/or social networks. The server infrastructure preferably is configured for storing digital asset data and some embodiments media content (interactive or non-interactive), for providing application interfaces (APIs) for management of the database, security, for interfacing with user computers, and for performing real-time applications for delivering media, receiving requests for digital asset information, receiving data for altering characteristics, and for altering characteristics. The server infrastructure preferably is in communication with (e.g., networked with) one or more media sources, such as user computers, via client applications, such that the digital platform manages the digital asset independently of the media sources. Communication may be continuous, ad hoc, or otherwise.

FIG. 1 shows an example technology stack 20 for a digital platform server infrastructure. The technology stack 20 includes development and operations (DevOps) services 21, data services 22, backend services 24, and application interfaces 26. Example DevOps services 21 include a game editor 30, a database explorer such as NOSQL explorer 32, a cloud editor 34, content configuration 36, a test rig 38, asset configuration 40, analytics tools 42, security and auditing services 44, and a digital platform editor 46. Example data services 22 include a database (e.g., NOSQL database) 48, an offline database 50, and data configuration services 52. Example backend services 24 include player management 54, events management 56, social management 58, store management 60, payment management 62, asset management 64, cloud services 66, notifications 68, and content management 70. Example application interfaces 26 include representational state transfer (RESTful) application interfaces, including native APIs 72, digital platform APIs 74, and authentication and security interfaces 76. The application interfaces 26 communicate with various computers, such as user devices, via communication protocols such as websockets 80. Example user devices 82 can use languages or platforms such as, but not limited to, iOS, Android, Unity, Facebook, Java, and HTML5.

Figure 2:
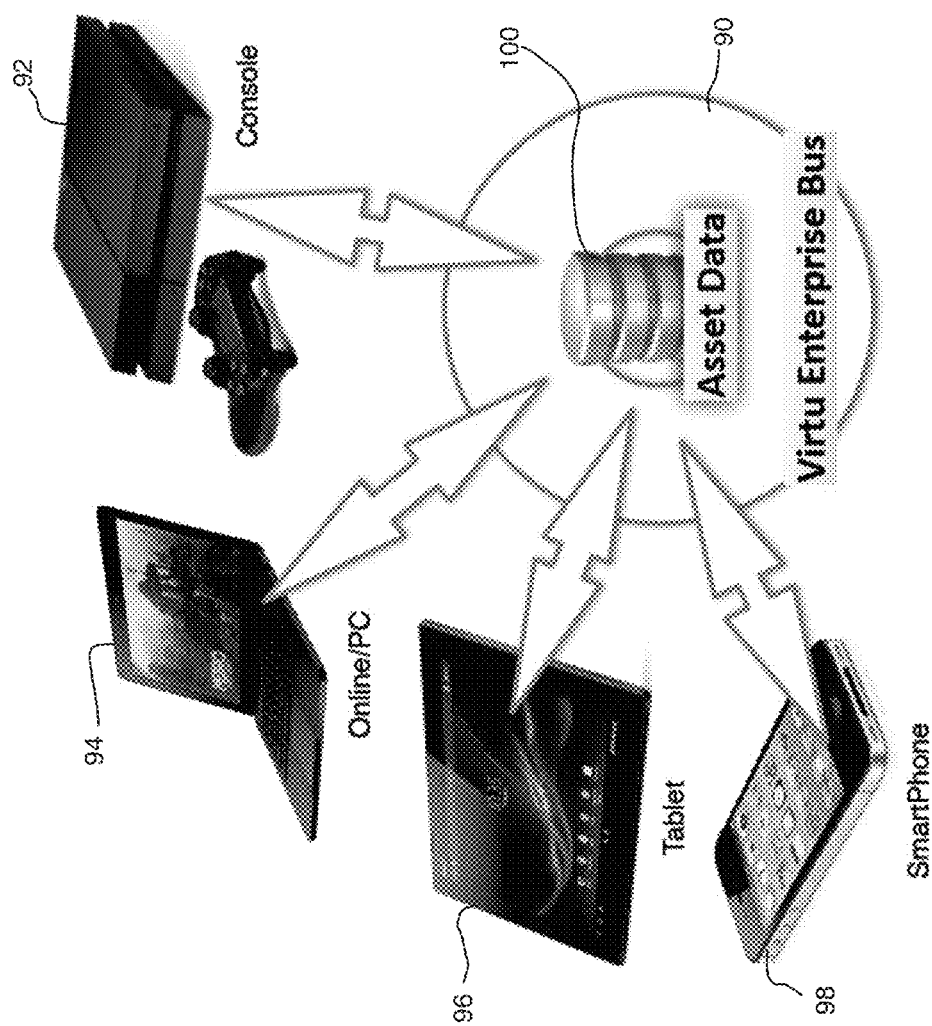
FIG. 2 illustrates a relationship between an example digital platform and various media sources.

FIG. 2 illustrates a relationship between an example digital platform 90 and various computers providing media sources. Computers embodied in each of a video game console 92, a laptop computer 94, a tablet 96, and a smart phone 98 are in communication (two-way, in this example), e.g., in a client-server relationship, with the digital platform 90. The digital platform includes storage 100 for asset data. The communication between the digital platform 90 and the devices 92, 94, 96, 98 can be via a portal, e.g., a browser or application (app) for the console or laptop computer, or a mobile browser or app for the tablet and smart phone. Each of the devices 92, 94, 96, 98 can respectively provide different media channels, the same media channels, or a combination. As a non-limiting example, each of the devices 92, 94, 96, 98 in FIG. 2 can provide a particular video game that is different from the video games on the other devices.

Figure 3:
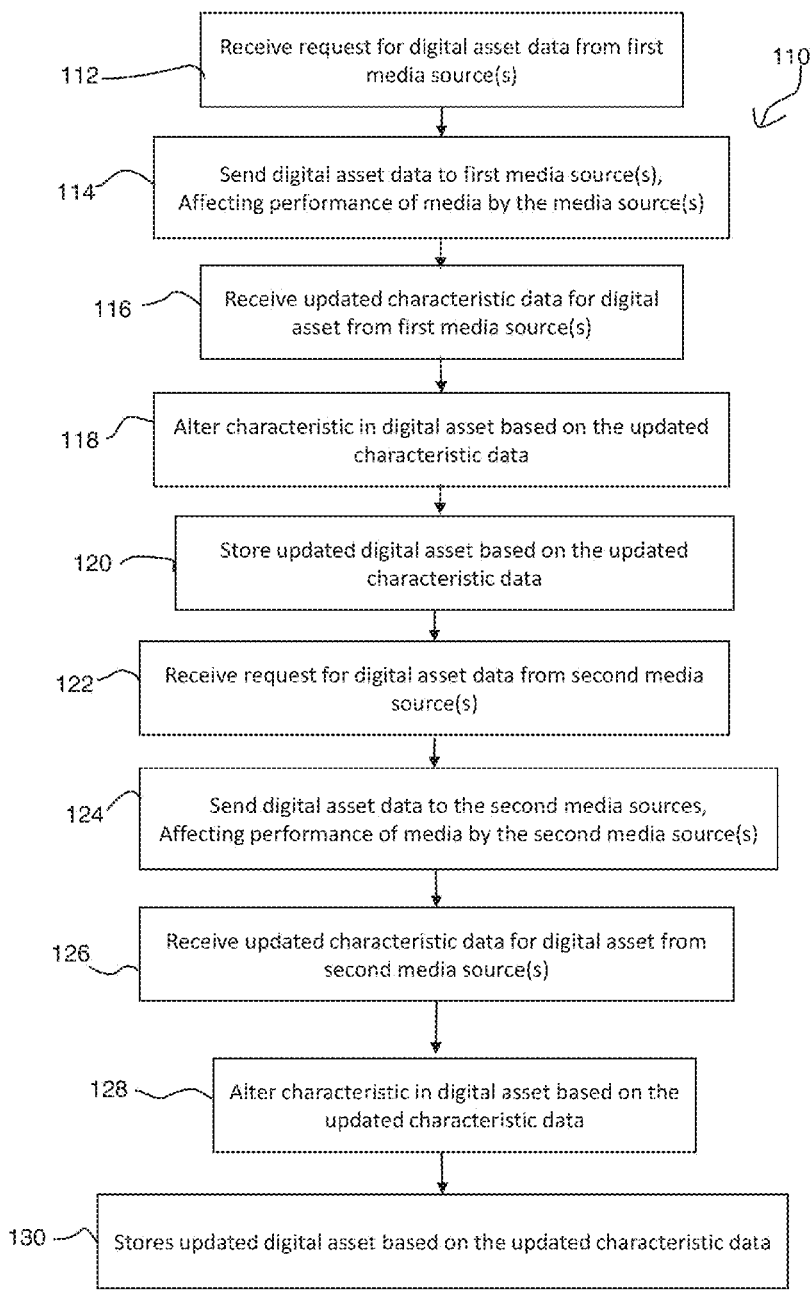
FIG. 3 shows an example method for managing a stored digital asset according to an embodiment of the invention.

FIG. 3 shows an example method 110 for managing a stored digital asset, which can be performed by one or more computers, such as but not limited to the computer(s) in the digital platform. The at least one computer receives (step 112) a request for digital asset data from one or more media sources, e.g., a first media source or multiple media sources (directly or indirectly). The first media source can be, as a non-limiting example, one of the computers shown in FIG. 2, executing instructions to provide media (e.g., to a user, or internally, for game updating or maintenance). The request may be for the digital asset identification information initially, for digital asset characteristics initially, or for both. For example, the at least one computer in the digital platform may receive user information, or information that can be processed (e.g., by searching a database) to locate associated user information, and retrieve digital asset data associated with the user information. The request can be omitted in some example methods.

At least a portion of the digital asset data, including one or more characteristics, is sent (step 114) to the one or more media sources, e.g., to the first media source or a plurality of media sources, either directly or indirectly. Examples of indirect sending include sending the digital asset data via a real-world object, a computer, a trusted device, a handheld device, etc.

The performance of the media by the one or more media source(s) is affected by the one or more received characteristics. For example, improved character statistics can affect a character's abilities in a game. Additional history of events can affect dialogue and story path. Visual characteristics can affect the display of characters or environments. These are non-limiting examples, and various other examples will be appreciated by those of ordinary skill in the art.

The at least one computer then receives (step 116) updated characteristic data from one or more media sources. The one or more media sources from which updated characteristic data is received may be the same one or more media sources to which all or a portion of the digital asset data is sent in step 114, a different one or more media sources, and/or overlapping media sources (e.g., sending digital asset data to some media sources, receiving updated characteristic data from others, and both sending digital asset data and receiving updated characteristic from still other media sources). Examples include the first media source (directly or indirectly), another media source, or from multiple media sources. This updated characteristic data can include data for altering, adding or replacing particular characteristics (e.g., level is now 30), or data that can be processed to alter particular characteristics (e.g., level is now increased by 5). Additional data can include, for instance, data providing a new accessory, new trait, new history item, new account detail, new game state, etc. This updated characteristic data, for instance, can be generated by actions that occurred during the use of the media source.

The at least one computer then alters (step 118) the characteristic in the digital asset based on the updated characteristic data. In some example embodiments, the at least one computer performs a trusted device or system check, such as but not limited to a digital handshake, exchange of code, receipt of pass code, etc. to confirm that the media source has the authority to alter the particular characteristics. The altered characteristic data is thus updated and stored (step 120), e.g., in the central database of the digital platform. This altered characteristic can then be sent to another of the media sources, and affects the performance of media by that media source.

Next (or separately), the at least one computer receives (step 122) a request for digital asset data from a second media source (directly or indirectly) or plural media sources that is/are preferably different from the first media source(s), but in some embodiments can include the first media source(s). For example, the second media source can be another of the computers in FIG. 2. This second media source can provide a different universe for a similar media channel (for instance a second console video game, where the first media channel was a first console video game). In another embodiment, the second media source is for a different media channel. For example, if the first media channel is a console video game, the second media channel is a handheld puzzle game, non-interactive movie, real-world device, etc. This request again may be for the digital asset identification information initially, for digital asset characteristics initially, or for both. The digital asset data, including one or more characteristics, is sent (step 124) to the second media source, either directly or indirectly. Performance of media by the second media source is affected by the received characteristic.

The at least one computer, e.g., the server infrastructure of the digital platform, then receives (step 126) updated characteristic data from the second media source (directly or indirectly). This updated characteristic data can include data for altering, adding, or replacing particular characteristics. Again, the updated characteristic data can be generated from actions that occurred during use of the media source. Such characteristics can include one or more characteristics that were previously altered by the first media source and/or other characteristics. The at least one computer then alters (step 128) the characteristic data based on the updated characteristic data from the second media source. The altered characteristic data is updated and stored (step 130), e.g., in the central database of the digital platform. Again, this altered characteristic can then be sent to another of the media sources (including the first media source, the second media source, or another media source), and affects the performance of media by that media source.

Non-limiting example data that may be stored for the digital assets (e.g., in fields or otherwise) include identification data, e.g., a unique (though possibly reused or reassigned) identification code of letters, numbers, and/or other symbols; user information, which can include account information, user personal information, purchase or acquisition history, etc., and characteristics of the digital asset. Identification codes can be serialized for improved tracking or analytics, or can be generated in other ways, e.g., randomized, hashed, concatenated from other data, etc.

Characteristics can include alterable and non-alterable characteristics, in any combination. It is also possible for the alterability of certain characteristics to be locked or limited until certain events (e.g., purchases, visited locations, etc.) have occurred. In an example embodiment, a digital asset is acquired having characteristics that provide basic capabilities (e.g., low strength or stamina, inability to possess certain items or access certain locations, etc.), until particular data is unlocked. Unlocking particular data can be accomplished by purchase, trade, reward, or in other ways. In a particular non-limiting embodiment, acquiring (e.g., purchasing) a real-world item having a chip (e.g., RFID, interfaced chip, etc.) and synching this chip with the digital platform via an accessory, computing device, or trusted system, unlocks and/or provides improved characteristics for the digital asset.

Non-limiting example characteristics, any of which can be alterable or non-alterable, include characteristics relating to: appearance, class, strength, stamina, intelligence, social status, level, name, history of previous events/other characters/achievements/media/locations, supplemental items, locations, friends/enemies, and others. Characteristics can be previously created and stored, created (e.g., generated by a suitable method as will be appreciated by those of ordinary skill in the art) or stored in response to an event (e.g., purchase of a new digital asset), or any combination thereof. Initial characteristics can be randomized, chosen by a user, or chosen by a third party. For instance, appearance characteristics can be linked to the appearance of a figurine, third party content owners can contract for inclusion of proprietary characteristics for a series of digital assets to promote a particular character or other intellectual property, etc., or any combination thereof. As another non-limiting example, a character for an upcoming movie can be represented as characteristics of created digital assets and engage with other media sources to promote the movie. Generating such initial characteristics and storing these characteristics, in any suitable way, is an example method for generating a digital asset.

In an example embodiment, a digital asset embodied in a virtual character is matured through a plurality of media channels. Each media channel is embodied in a different media source in communication with the digital platform. However, in other examples, multiple media channels can be provided that are the same media source; e.g., two different video game universes. Further, the same computer can provide different media sources, such as a computer having different apps, apps and access to a game via a web browser, etc. Maturing includes modifying one or more alterable characteristics of the virtual character, for instance by altering one or more data fields for the virtual character's digital asset.

In this example, one media channel is a console video game, such as an RPG or platforming game, which are non-limiting examples of interactive media. Identification for the digital asset is received by the console, either upon request or without a request. The console or other media source, for example, can request a digital asset identification by notifying a user, and/or may request the digital asset identification directly or indirectly from the digital platform. The digital asset identification from the user can also be provided directly from a real-world item, or by a trusted system or a computer, including the media source. Requesting digital asset identification from the digital platform, for instance, can include sending user information to the digital platform, and receiving digital asset identification associated with the user information.

During any suitable point in operation of the video game by the console, one or more characteristics of the digital asset can be requested and received (e.g., downloaded) by the console, for instance from the digital platform via a network (LAN, WAN, internet, VPN, etc.), from a computing device or accessory that is connected to the database or cloud service, from a real-world object or real-world accessory, or by any other suitable device or method, in any combination. The characteristics can be retrieved along with the digital asset identification (e.g., from a real-world item, trusted system, computing device, central database, etc.), or subsequently in response to the media source requesting the characteristics and sending the digital asset identification, e.g., to the central database.

It is not required that all characteristics be received by the media source, such as the console. For example, some characteristics may not be pertinent to the particular video game, and thus a request may be made only for certain characteristics, that is, a portion of the digital asset data, as opposed to downloading all characteristics and using only the pertinent ones. Further, some characteristics (e.g., inalterable ones, though alterable characteristics are possible as well) may be already stored with the video game itself, and additional ones can be downloaded as needed. However, in other embodiments, all characteristics for a digital asset are received by the media source.

During some portion of the performance of the video game, the console implements or changes one or more aspects of the performance of the video game in response to the retrieved characteristics. An example of this can be similar to the introduction of a character or object into the Skylanders™ video game system, or can be similar to the introduction of a character into a so-called massive multiplayer online role-playing game (MMORPG) such as World of Warcraft™. For example, appearance characteristics can be depicted on a screen, strength characteristics of a character can affect the outcome of virtual battles, etc.

Additionally, the console also alters one or more characteristics of the digital asset (e.g., character) in response to events of the video game. For instance, the hit points, experience points, or level of the character can be increased based on events of the game, the locations traveled and other characters met (either user controlled or so-called non-player characters (NPCs)) can be stored, the character's appearance can be altered based on events, traits, or acquired items (e.g., clothing), etc. "Rare" power-ups and abilities in the game can enhance the digital asset in unique ways, providing a collectible value to the video game itself. Digital asset characteristics can be altered either directly by the console communicating via the network, or indirectly via networked accessories, storing data on real-world objects, etc. This provides a first maturing of the character.

Figure 4:
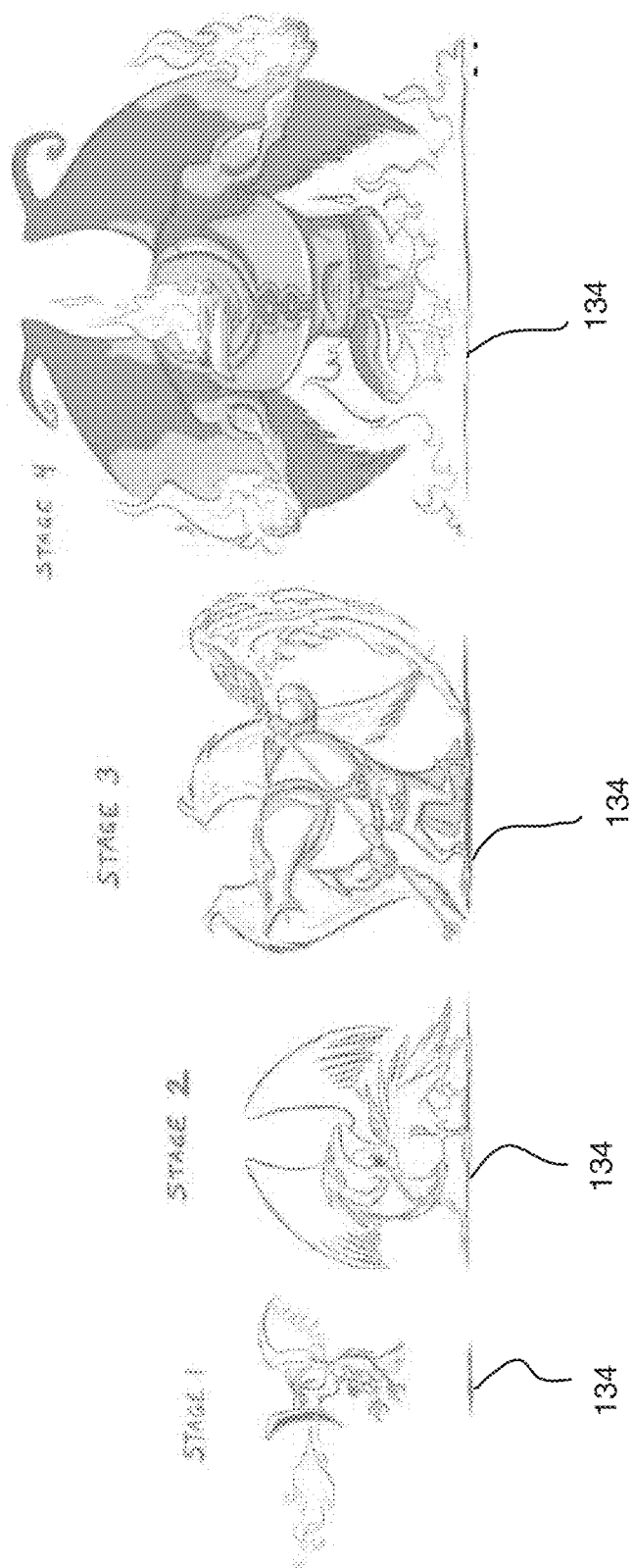
FIG. 4 shows stages in an example virtual character as it matures.

FIG. 4 shows an example virtual character 134 represented by a digital asset as it matures. The character 134 can progress through "stages" 1, 2, 3, or 4, each of which provide various benefits and affect the character's visual depiction. Altering a stage characteristic stored in the digital platform, say from stage 1 to stage 2, can result in a stage 2 character being playable in a plurality of media sources.

Further in this example, characteristics for the same digital asset can be accessed by a different media source, a mobile device, for use in a different media channel, a character-based RPG or puzzle game. Again, at some point during performance of the game, the mobile device requests and retrieves (e.g., downloads or otherwise accesses) characteristics for the digital asset. One or more of these retrieved characteristics are used to implement or change performance of the RPG or puzzle game. As a non-limiting example, the character's level and abilities can affect the outcome of battles in the RPG game, or the character's appearance can be depicted in the puzzle game. The other characters that have interacted with the character may be made available or otherwise referenced in the RPG or puzzle game. The locations to which the character has previously traveled can provide or be used to select backgrounds or environments for the puzzle game. Enemies encountered by the characters can be represented by icons or obstacles in the puzzle game.

Similarly, the mobile device can cause one or more characteristics of the character to be altered based on the performance of the mobile RPG or puzzle game, by interfacing with the digital platform. For instance, "special" items discovered during the RPG can be stored for later use in other media. Solving the puzzle game may increase the character's intelligence characteristic. Other characters or environments encountered may be stored as history and referenced in other media. In an example embodiment, this can give a user a chance to so-called "level grind" on a portable device to alter the character's level or virtual money in other media, such as the console game above. This provides a second maturing of the character.

Another example media channel is a social game, such as a resource management game. Here, a computing device or server hosting the game can request and retrieve characteristics of the (same) digital asset from the digital platform and implement or alter performance of the game based on the retrieved characteristics. For instance, the same character's money characteristic, altered from a previous RPG, can be used as currency in the game. The character's appearance characteristic, altered in the console game, can affect the depicted avatar in the game. Characters from other users encountered in RPGs can trade items for the game. Virtual prizes won from the puzzle game or discovered items in the console or RPG can be used in the resource management game. If physical characteristics, such as character speed, intelligence, persuasion, etc., are useful in the resource management game, such characteristics can be retrieved and used to affect the game as well. Required social contacts in some resource management games can be provided by supplying characteristic data for other players or characters met.

The computing device and/or server may also alter one or more characteristics of the character based on events during the resource management game by interfacing with the digital platform. For example, money or items acquired, characters met, or encountered locations may be stored as digital asset data. The character's social status can also be stored, and, for instance, could affect relationships with characters in other games.

Real-world objects can themselves include non-volatile storage or other suitable storage for storing digital asset characteristics. Such storage can be duplicative of that stored in the digital platform and/or can include additional information. Such objects can be collectible, with unique characteristics, benefiting from a unique identification solution, that can be modified from a wide range of real-world, interactive and non-interactive situations. A user can engage with such objects in a mix of real-world experiences as well as within virtual, online experiences. These engagements can evolve and further uniquely modify the object based on a confluence of different engagements.

In a non-limiting example, characteristics for a digital asset useful for playing a video game can be stored in the real-world object for delivering to a game console, and changes to one or more characteristics can be stored in the object for later synching to the digital platform. Alternatively, the game console can interact with both the real-world object and the digital platform to initiate the change at both places.

The real-world object can also include identification information for the digital asset, which can be suitably serialized, encoded, and/or encrypted as will be appreciated by those of ordinary skill in the art, and can be used to access, unlock, register with, or otherwise associate with the digital platform. Such identification information can include data that is not identical to the identification information stored as part of the digital asset, but is suitably associated with the digital asset to uniquely identify it. Once identified, the virtual characters associated with the digital asset can be introduced, e.g., added to a video game. In a particular example, the objects are uniquely serialized, and are protected via either a self-contained encrypted key that is modified via interaction with a trusted peripheral with its own encrypted key or by interfacing with other secure network services.

Unique characteristics of the digital asset represented by the real-world object can include, but are not limited to, traditional game details such as hit points, level, experience points, strength, endurance, class, type, race, age, unlock ability for new attributes, etc. Further, the digital asset characteristics can include non-traditional details such as places the object has been in the virtual and the real world, additional virtual gear it has collected along the way, number of events it has attended, number of locations it has been, types of shows it has been registered with, etc.

In this way, the more a user engages with such an object, the more unique it can become. Example engagements include importing the object's details into a wide range of videogames for use within that virtual world. Actions within the game world can modify the core object's characteristics. Another example engagement is adding the object's details into a special type of smart non-interactive media such as a television show, movie or commercial. Yet another example engagement is taking the object to a specific location or real-world event and "checking in" the object.

The user, either directly with the digital platform or via the media source, may be able to modify digital assets associated with a real-world object for further personalization. Such modifications could include look/appearance, sound, tweaked parameters such as size/dimensions or other aspects, etc. The altered characteristics can be re-uploaded to the object and/or the digital platform. In some example embodiments, "rare" power-ups and abilities obtained via a particular media channel (e.g., a game) enhance the collectible and competitive nature of the figures. Such power-ups and abilities could be, for instance, provided by codes displayed on certain shows, providing a unique characteristic (a certain power, a badge, etc.) for the figure.

In some example embodiments, the real-world objects may include one or more feedback devices, e.g., disposed in or on the objects (e.g., within a base of the objects, or elsewhere), for conveying information relating to one or more characteristics, including state information. Feedback devices include but are not limited to displays (monitor, LED or some other visual communication solution), sound chips or cards, speakers, RFID devices, wireless radio devices (e.g., Bluetooth, Wi-Fi, ad hoc network, etc.), interfaces, and others. Identification information for the digital asset, which may be displayed or otherwise transmitted from the real-world object, could also be used for other purposes, such as but not limited to a unique ID for accessing social interactions online, providing anonymity and privacy. Some example objects can communicate with other objects via a form of visual communications between its display and the other devices sensing equipment. This can also be accomplished with audio communications.

In some example embodiments, figures including a display can also be used to provide a unique identification (ID) method for social interactions online. For instance, a child could use a real-world figure having a unique id to log into a website. The state of the figure (and the digital asset) could affect the number of logins, the particular access, etc.

In some example embodiments, users may not need a real-world figure to start their adventure, but may acquire one afterwards. For example, an online game purchase can provide a user with a "spirit class" of virtual character. However, such users, for instance, can be limited to a range of capabilities until upgrading, such as by providing an additional code. Codes may be provided in various ways, including by purchasing and synching a chip (which can be integrated into a figure or provided in other ways).

In other embodiments, the real-world objects can interface (one-way or two-way) with accessories for conveying information. For instance, a real-world accessory can include a figurine that interacts with a stand or dock that conveys information. Other accessories include computing devices providing trusted systems, such as but not limited to smart phones, tablets, retail displays or kiosks, other toys, etc., which can include applications for interfacing with the real-world object (wired or wirelessly) and conveying information. Such accessories can include, for instance, mobile device applications that retrieve characteristics from a database and display them for a user. In other embodiments, objects can either directly or via a direct wired or wireless connection to a smart device or docking station, interface with the digital platform. Example interfaces include GPS, camera (with object recognition intelligence either on the object or communicated from the object to a secondary system), voice/sound input or other means of identifying a unique situation, etc., to retrieve and convey information about the digital asset without the presence of another real-world object. Some example trusted systems can have authority to both receive and alter characteristics of the digital asset. Suitable security can be provided for establishing trusted systems, as will be appreciated by those of ordinary skill in the art.

The real-world objects can be made available for acquiring at retail or by other commercial methods. Once acquired, a use could register the object (and the digital asset) with the digital platform. Registration can be done via docking or otherwise interfacing the object with a computer (e.g., gaming console, personal computer, smart device, networked device, etc.) This registration creates a unique and trusted pairing between the object and the digital platform's registry. The digital asset associated with the object can be leveraged in any videogame that supports the registry. The digital platform can provide encrypted, trusted computing protocols to ensure the accurate registration and tracking of digital asset ownership. Outcomes from a trusted application can modify the objects characteristics.

In another example media channel, real-world items can request and retrieve characteristic data as described above, and implement or alter a performance of the real-world object. For example, after retrieving identification information for the digital asset, a kiosk at an amusement park or retail establishment can retrieve characteristics and display an interactive game or non-interactive movie relating to the character. A toy could include features that are unlocked or improved depending on retrieved characteristics.

Similarly, real-world items or locations can alter or create characteristic data. This may be performed either directly via the digital platform, or indirectly via one or more trusted systems. Trusted systems such as but not limited to computers, and preferably handheld computing devices, can communicate with real-world objects, GPS, radio signals, other wireless signals (e.g., infrared), and to the digital platform. As non-limiting examples, acquiring new figurines or real-world items can improve characteristics such as strength, defense, etc. (and the items can themselves be digital assets and used as otherwise set out herein). Real-world miniature tools can alter the accessories' characteristics. GPS coordinates, wireless signals, particular real-world locations, etc., can affect history or similar characteristics so that a virtual character can "travel" as a user does.

In some example embodiments, the geolocation history of an object can be stored as part of digital asset data. For example, a "birthplace" (e.g., the first location the device is provided or registered to the owner) may have relevance in future interactions. As another example, a modifying asset from the same geolocation-based city may receive extra modifiers. A character registered in a unique location such as a specific retail location can get bonuses sponsored by the retailer.

Yet another example media channel is interactive or non-interactive video, e.g., a movie. Example movies can include a real-time (or substantially real-time) 2D or 3D movie streamed to a media source. The media source can be provided by a mobile or browser-based app, or in other ways. Example movies have proprietary "hooks" that allow animators to leave open aspects of the cinematic experience for virtual characters or other digital assets to be dropped in and affect the story and/or the virtual character. A series of movies can be uniquely developed for a specific, dedicated set of intellectual property (IP), or can be broad-based that crosses series managed through servers.

In an example method, the media source retrieves characteristic data either directly from the digital platform or elsewhere, as described above. The characteristic data implements or alters performance of the movie based on the retrieved characteristic(s). The events, or sequence of events, that take place in the story (e.g., as implemented by channels, tracks, frames, locations on disc or files, real-time events, etc.) can be affected by certain retrieved characteristics.

For example, a real-world object (and associated digital asset) can represent a virtual hero character. A consumer can register this object with the digital platform as described above. The object is synced with a smart device that is equipped with a trusted network application that provides for a 2D and 3D streamed movie. The object's character is portrayed within the story of the movie as a 2D or 3D animated character. Plot points in the movie's script are altered based on characteristics of the object such as the race, age and name of the character.

Figure 5A:
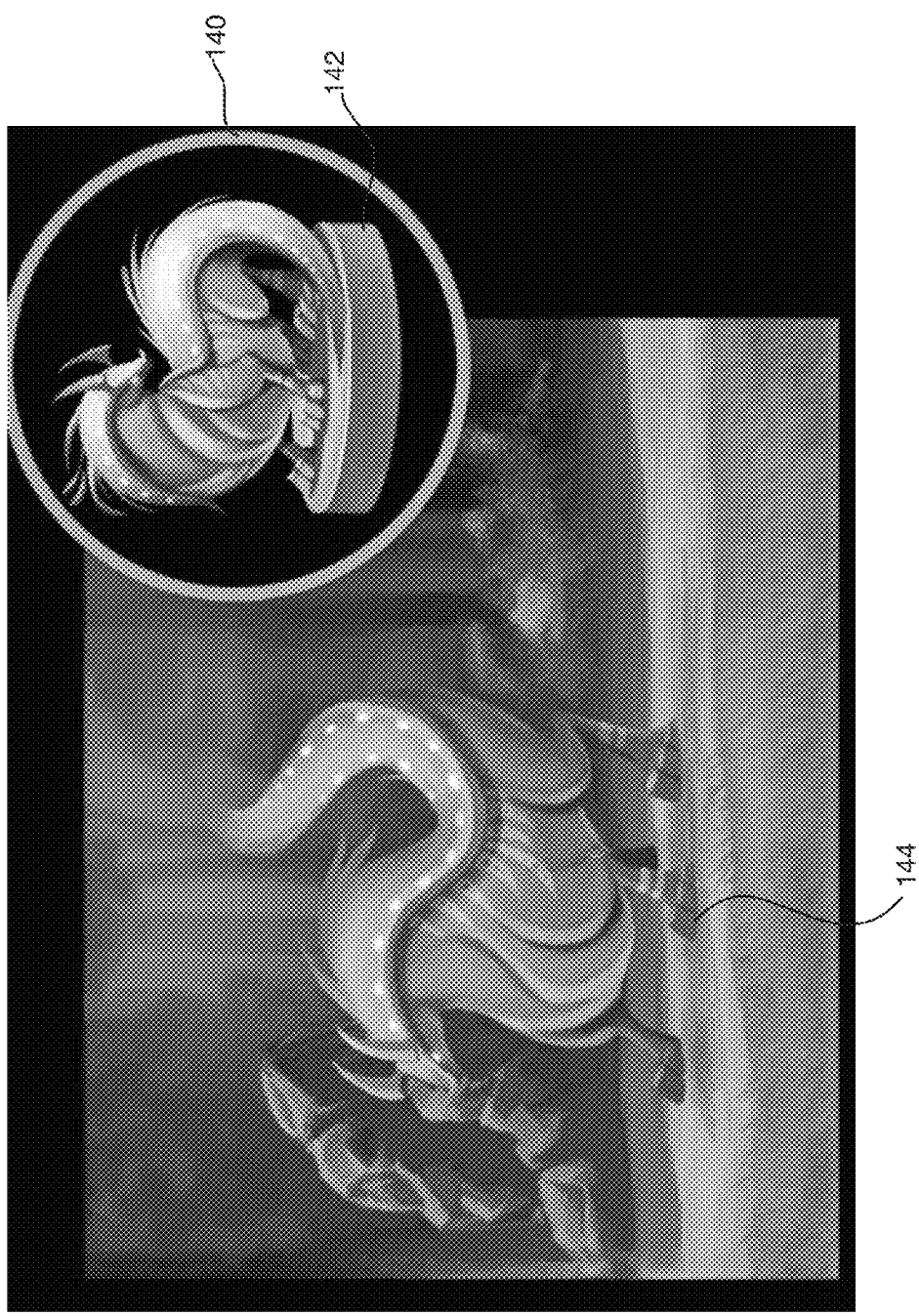
FIGS. 5A-5D show screen shots depicting stages in an example movie that can be customized by digital asset data, where
Figure 5B:
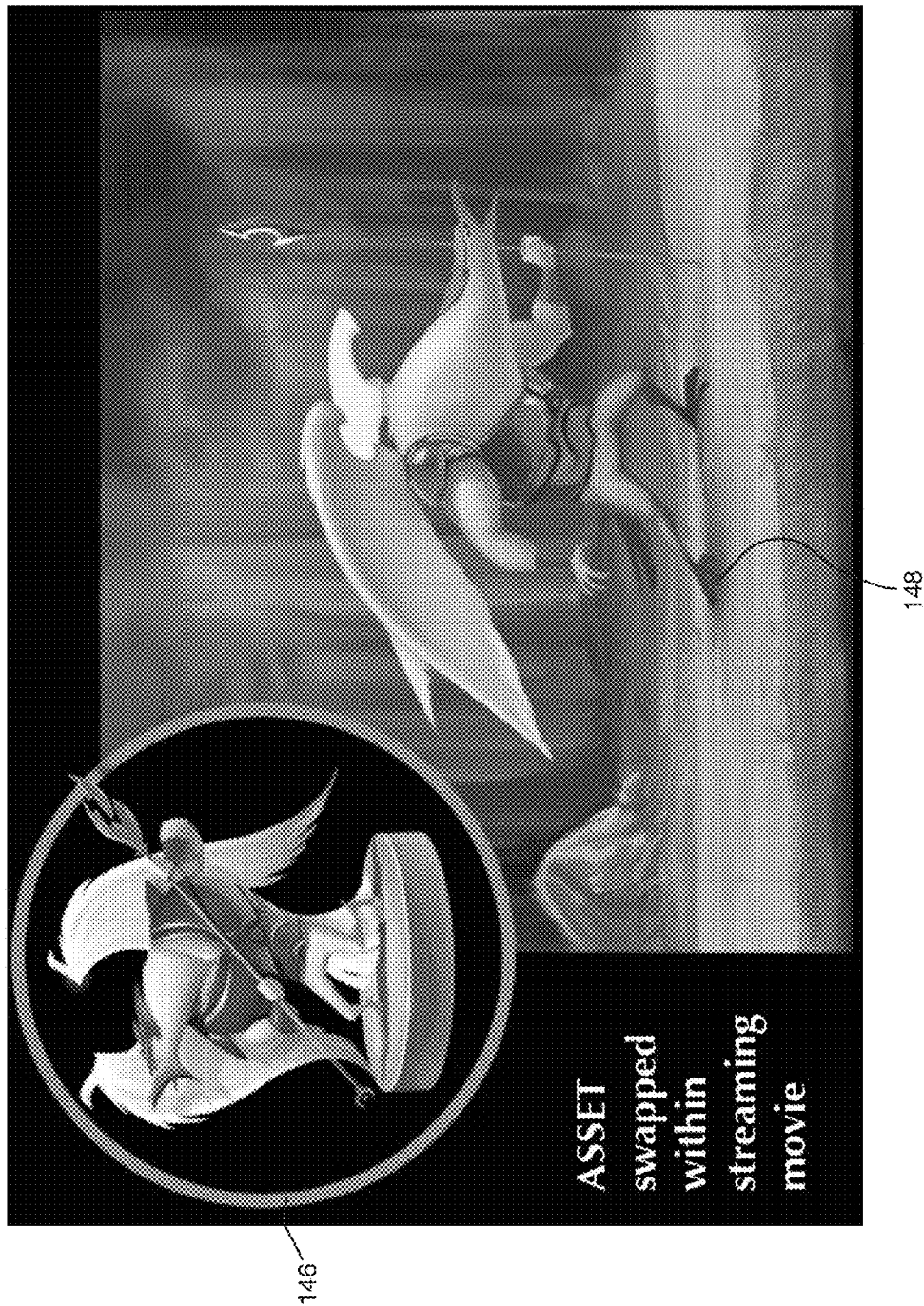
Figure 5C:
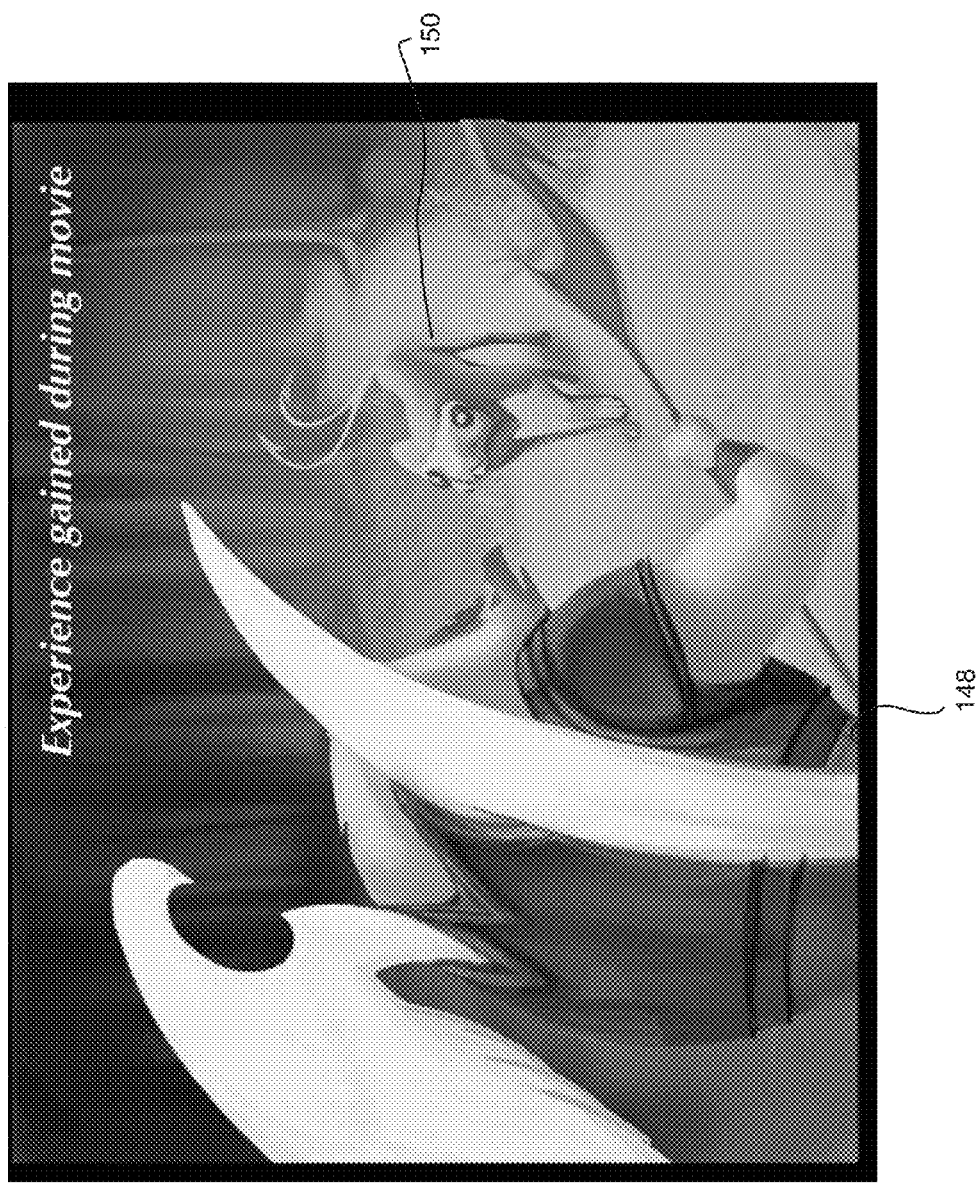
Figure 5D:

FIGS. 5A-5D show stages in an example movie. In FIG. 5A, a real-word figurine 140 with a base 142 that can store an RFID chip, digital storage, etc., is shown that is associated with a digital asset, along with a virtual character 144 within the movie that is associated with the digital asset. The figurine 140 and virtual character 144 can be provided with a similar appearance, though this is not necessary. In FIG. 5B, a second real-world figurine 146 is shown that is associated with a second, different digital asset. A virtual character 148 associated with the second digital asset is shown in the movie. FIG. 5C shows an event taking place in the movie with the second virtual character 148, particularly meeting a non-player character (NPC) 150 in the movie. FIG. 5D shows characteristics 152 for the second virtual character 148, which have been updated based on the event in FIG. 5C.

Say the character is in a one-on-one battle with a foe. The movie foe has its own characteristics and based on a comparison of these stats, the smart device app determines the ending of the movie's battle. In this example, the outcome is that the object character is stronger in some key characteristics like strength or abilities and as a result wins the battle and earns experience points which are added to the object characters characteristics information as well as unlocking a new addition item to the digital asset's inventory as a special reward. This new item can be leveraged within other movies or other applications that access the digital platform.

Digital assets (e.g., art, sound, 3D geometry and textures) to represent the characters can be stored on the object's storage and provided to the devices and applications via the object's internal storage and transmitted via direct cable, wireless (802.11, NFC, Bluetooth or other wireless protocols). Alternatively, after a match or sync with an object to a media source application is established, the digital platform can unlock and download the assets to the media source. To optimize this process, common assets leveraged across many objects can already reside (be cached) within the app from other objects already loaded to make download and application storage more efficient.

In an example method for customizing a movie, either interactive or non-interactive, video may be prepared, accessed, or otherwise provided. The video includes one or more portions that are or can be affected by characteristics of a digital asset. Such portions can include, but are not limited to, frames that can be overlaid with pictures or video based on the characteristics, sequences, routines, events, or other elements that are selected based on the characteristics. Video can include video similar to entertainment videos, movies, television shows, animated video, or any type of video that may be suitable for providing to a user for viewing. In a particular non-limiting example, the video includes a representation of the digital asset including certain characteristics of the digital asset, either alterable or non-alterable.

For example, for a "hero" virtual character having certain characteristics such as (in a particular non-limiting example) name, voice, appearance, such a hero can be depicted in the movie. This video can be provided, for instance, on the digital platform, or by another server accessible by the digital platform, and sent to a media source upon request. It is also possible that all or part of the video can be stored on the media source for later playback. The video can be streamed in real time or substantially real time, downloaded as a file and played back, partially downloaded and supplemented in response to particular characteristics or prompts from a user or requests from the media source, or in any other suitable manner. Videos can be supplied either directly to a user (e.g., via browser or app playback), or supplied indirectly, such as via other sources that display the movie via proprietary methods. Characteristics for multiple digital assets can be added in this way to further customize and affect the presentation.

Performance of the video can be further configured or altered based on the characteristics of the digital asset. In a particular embodiment, a story includes proprietary "hooks" that allow virtual characters based on the digital asset's characteristics to be dropped in. Such characteristics can affect the story, e.g., branch or change a particular show, and in a particular embodiment even affect the virtual character. If, for instance, a character has encountered a particular location or other character, this can be referenced in the movie by generating, adding or selecting video (or portions of video, including any of picture, sound or text) that depicts or describes this location or additional character. If a character has a sufficient strength or skill, the movie may show the character "winning" a particular battle (or vice versa) by configuring or modifying video data.

The appearance or accessories of the character can be affected by appearance or accessories characteristics by configuring or altering video data. This can be done in real-time, for example, by overlaying computer-generated images on existing video, selecting particular portions of video data to combine with other data, and/or by animating in real-time (if sufficient computing resources are available). This allows the character to "star" in the non-interactive movie. The user can enjoy a customized movie starring a customized character. Though it is preferred that the movie be non-interactive (that is, that portions of the movie or the entire movie including portions based on the digital asset being capable or running without input from the user, allowing the user to passively enjoy the content), it is also contemplated that the non-interactive movie can be part of an interactive experience.

Further, in an example embodiment, one or more characteristics of the digital asset can be altered in response to the performance of the movie by the media source. The media source can generate or store data relating to the particular movie that was played, and alter characteristics based on this generated or stored data. For example, if the character in a movie visits a particular location and/or encounters a certain other character, this history can be synced and stored with the digital asset. If a character wins (or loses) a battle that is depicted during the movie, the character's health, experience, stamina, etc. can be synced and altered. This affords, for instance, the creators of the video the opportunity to add unique offers for digital assets (e.g., for objects), including offering traditional modifications to the digital assets or non-traditional rewards like real-world offers including sweepstakes or other goods. Choosing the right object or otherwise importing digital asset data to a movie could play a key role in the right outcome occurring at the end and a specific reward to the consumer's object for choosing correctly.

Movies can be uniquely developed for particular universes, or more broadly for crossing of universes (multiverse). This allows a virtual character to possibly star in a continuing series of stories or even to cross over into other series. In an example embodiment, the digital platform manages the movies and retrieves/updates the characteristics as needed. Particular movies can provide advertising, with rewards for watching the advertising including characteristics such as but not limited to a unique ability/power, a unique badge or other accessory, etc.

It should be understood that these are merely examples of how characteristics of digital assets can be used. Any combination of media can be affected by, and affect, the digital asset, which preferably is maintained independently of the media itself. In this way, such media can affect the digital assets, which in turn can affect other media, which in turn can further affect the digital assets, and so on. This allows a digital asset, such as but not limited to a virtual character, to mature across various games and media, and even within real-world locations and events. Those of ordinary skill in the art having reference to the present application will appreciate that many other combinations of characteristics, digital assets, and media sources and channels are possible, and these are submitted to be under the scope of the present invention.

Figure 6:
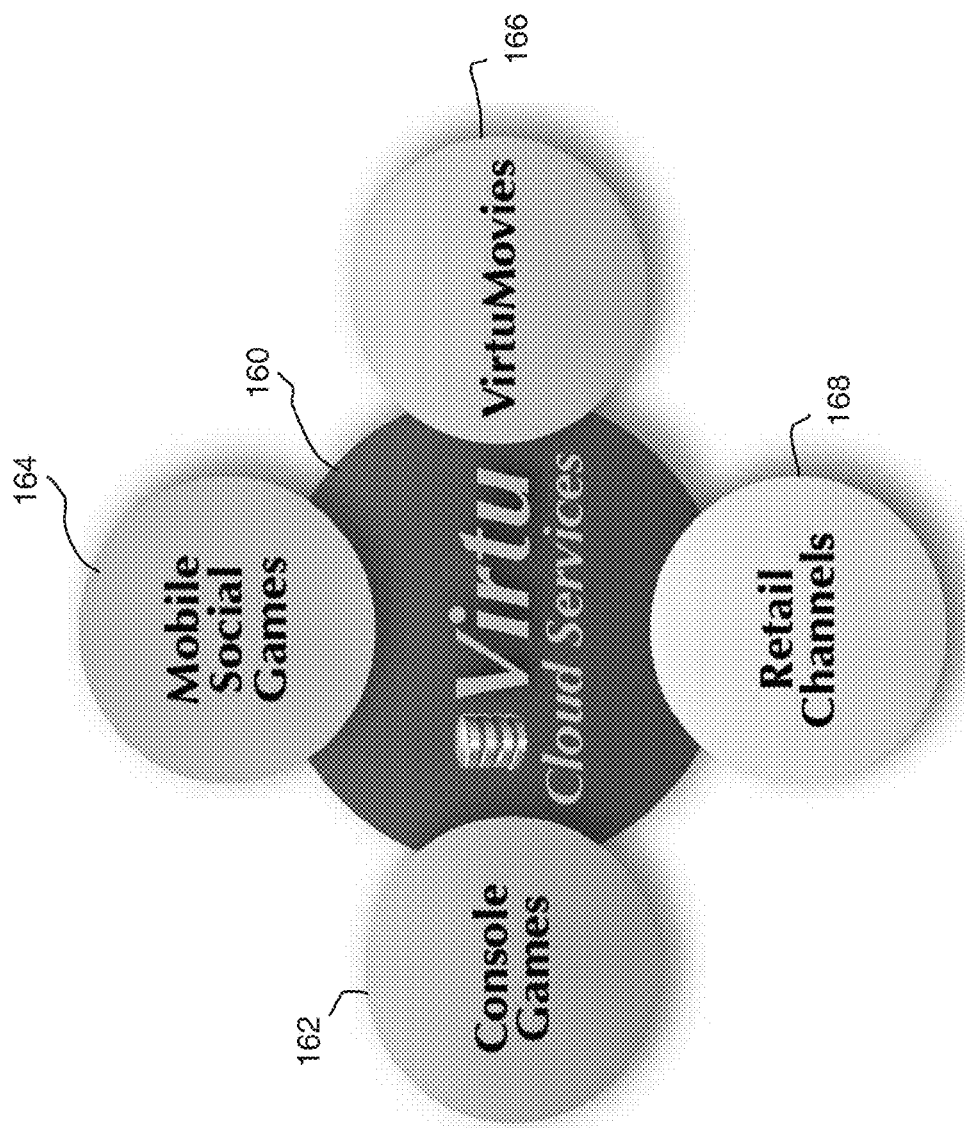
FIG. 6 illustrates an application of an example digital platform with various media channels and retail channels.

FIG. 6 illustrates an application of a digital platform 160. In FIG. 6, media sources for various media channels, such as console games 162, mobile social games 164, and movies 166, and retail channels 168, are linked via the digital platform 160. Retail channels 168 may include, as non-limiting examples, stores, kiosks, websites, etc. The same digital asset, e.g., a virtual character, can be matured through a multitude of channels, so that the virtual and collectible digital assets are developed across media channels.

The console channel 162 can, for instance, provide collectible characters in a 2D or 3D action/platform experience. The mobile social game channel 164 can provide a free-to-play or "play for fun" character-based role-playing game (RPG) or puzzle game. Alternatively or additionally, the mobile social game channel 164 can provide a resource management game. The movies channel 166 provides real-time 2D or 3D interactive or non-interactive movies streamed to devices enabling the virtual character to star in the movies. The movies can modify the virtual character's characteristics, such as their uniquely based story, type of characters, capabilities, etc.

The virtual characters can evolve, increase levels, add capabilities, etc., and can be further modified through additional purchases via the retail channel (e.g., retail purchases of figures or accessories). Real-world figures acquired via the retail channel 168 are "transformed" into virtual characters and other digital assets, which can be connected via a series of networked products. The digital platform 160 maintains a common social linkage between all digital assets across the cloud services platform.

Preferably, the data services in the digital platform 160 store the digital asset data, manage the digital asset data independently of the plurality of media channels and retail channels, and provide a clearinghouse for the data for accessibility by all of the channels. This also better allows the asset data and user information, including but not limited to account information, to be managed at a central location. However, it is contemplated that digital asset data could be stored partially or entirely remotely, for instance, in storage with any of the individual media sources, real-world objects, computing devices, etc., and accessed via networking, wireless or wired communication, or other suitable protocols.

An example digital platform provides a suite of cloud services that link a common game asset multiverse. Promotional and loyalty aspects of the multiverse can be leveraged to provide revenues from a dedicated library of premium entertainment properties. In example embodiments, at least some of digital asset data can be acquired, purchased, sold, traded, upgraded, etc. independently of the multiple media sources.

In another example embodiment, the digital platform stores and manages at least one digital asset including characteristics for affecting and being affected by one or more media sources, such that the digital asset is managed independently of the media sources. The digital platform can sell access to digital asset data with managers of the media sources, and digital asset data can in response be provided to the media sources as discussed elsewhere herein.

The digital platform can communicate with one or more content providers or IP owners for creating or altering digital asset data, and for monetization. For example, content providers and/or owners of proprietary character intellectual property can engage in agreements whereby, for a fee, digital assets are generated having characteristics that are associated with the proprietary character (for example, for a proprietary character having a certain likeness, aspects of the likeness can be represented by characteristics in the digital asset) so that the proprietary character is promoted across multiple media sources. Owners of proprietary characters can alternatively or additionally charge users, or even managers of digital assets, for rights to incorporate such characters as digital assets. Users can request particular characters (or virtual property), upgrade or trade characters (e.g., facilitated by altering identification or user information), create personalized characters, etc., and such requests can be received by the manager of the digital assets, e.g., for a fee, as part of a promotion etc., and fulfilled by the digital platform by creating or modifying the digital asset. Users can be notified of fulfillment by suitable methods, such as an instant reply, display, or other digital message.

In a particular example method, the digital platform receives requests from external entities, such as IP owners, content providers, etc., to alter or create digital assets. These request enter a queue. The digital platform can review the requests either automatically based on predetermined criteria, or can enable manual review of the requests in the queue, such as by presenting the requests to a user and receiving acceptance or denial of a request. Accepted requests are passed through to the digital platform to create or alter digital assets or digital asset data. It is also contemplated that the digital platform store multiple states of digital assets over a period of time, so that changes to digital assets (including alteration, creation, or deletion) can be reversed or undone. A log of digital asset changes can be created and maintained for facilitating undoing of digital asset changes.

Using the example digital platform, media developers (developers) and users can interact to create unique experiences. The user's accumulated game assets in an example embodiment are stored, and are available independently of any one medium (e.g., game). Over time, the users can invest time, money, and/or assets in a digital asset, increasing the likelihood that the user will remain engaged with the digital platform.

In an example embodiment, each channel (media, retail) has dedicated product experiences built specifically for that channel's ideal monetization strategy. For example, the console channel 162 can feature a real-time 2D or 3D experience, such as a retail game purchase or a game that is purchased via the digital platform's online store. The mobile and social games channels 164 can leverage traditional platforms associated with free-to-play (FTP) or "play for fun" revenue methods, or derive revenues in other ways. The movies retail channel 166 can leverage enhanced streaming media channels, advertising revenues, subscription content offerings, etc.

To provide additional example monetization opportunities, the digital platform 160 can provide a digital auction house where users can auction, trade, barter, or donate assets. An interface for the digital auction house can be a portal, such as but not limited to a web portal, a mobile web portal, etc. Payment among users preferably is premium currency, such as but not limited to virtual currency, though real currency may be used. A transaction fee or other fee can also be collected by the digital platform. As another example, the digital platform can assess royalties and licensing fees to join a publishing platform's meta-verse of brands. In other examples, the digital platform can be licensed for OEM/white-label opportunities. Consumers can trade or sell objects and the secure systems can administer these transactions. Either the physical object can be traded or the virtual objects details can be transferred and recombined with a blank object. This provides another example way of exchanging digital assets or digital asset data among users (players).

Figure 7:
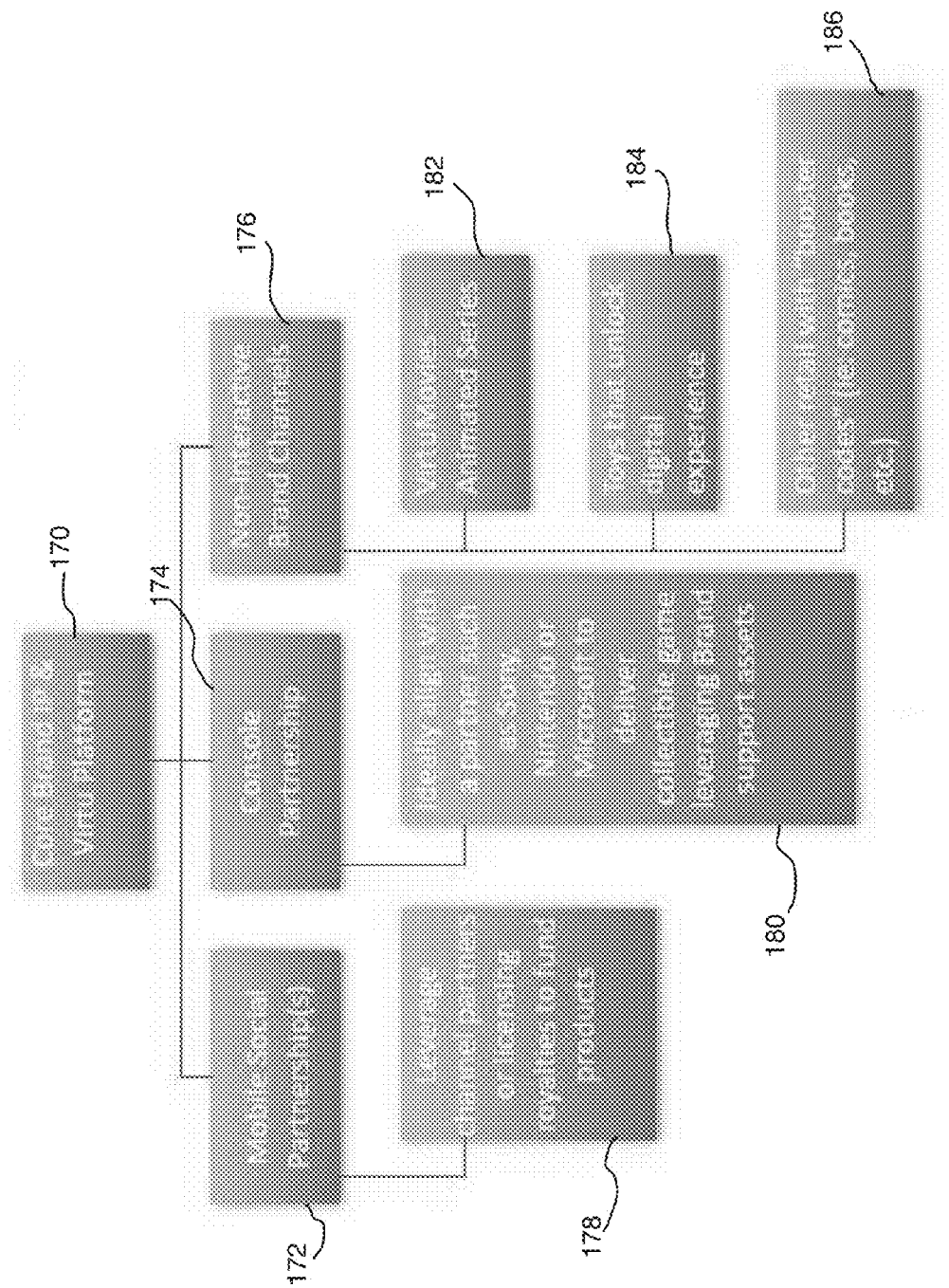
FIG. 7 shows another example interaction of an example digital platform with various channels, and leveraged assets.

FIG. 7 shows an example digital platform 170 illustrating relationships between the digital platform and partners in various media channels and retail channels. For example, the digital platform 170 can interact with partners representing various channels including a mobile social partnership(s) 172, a console partnership 174, and non-interactive brand channels 176. The mobile social partnership 172 can leverage channel partners or licensing royalties to fund products 178. The console partnerships 174 can align with IP partners to deliver collectible games leveraging brand support assets 180. The non-interactive brand channels 176 can leverage non-interactive movies, such as an animated series 182, toys that are used to unlock digital experiences 184, and other non-interactive media 186 including "booster codes," examples of which include comics, books, etc.

By providing a cloud-based server architecture and standardized application interfaces (APIs) that are configured (e.g., solution optimized) for the management of serialized digital assets integrated with real-time applications, an example digital platform can provide significant value for entities focused on better integrating the real world and the virtual world. An example digital platform provides a value-added platform for businesses that maintain large, interactive communities, media networks engaged in digital content distribution, communication companies, consumer/retail entities, and social networks. As shown in FIGS. 2, 6, and 7, example digital platforms can be employed by mobile, social and retail/console game publishers to add new, competitive features for their games and community.

In some example embodiments, the digital platform is provided to track ownership of digital assets, and other (e.g., offline) apparatuses or methods are provided that are authorized to transfer ownership. For example, an application encrypted with proper authentication codes can be configured to handle offline transactions, and when the asset is reapplied to a networked service, the transaction is registered within the digital platform. This is an exemplary way of enabling communication between the digital platform and users to facilitate exchanging of digital assets or digital asset data of a particular digital asset.

Figure 8:
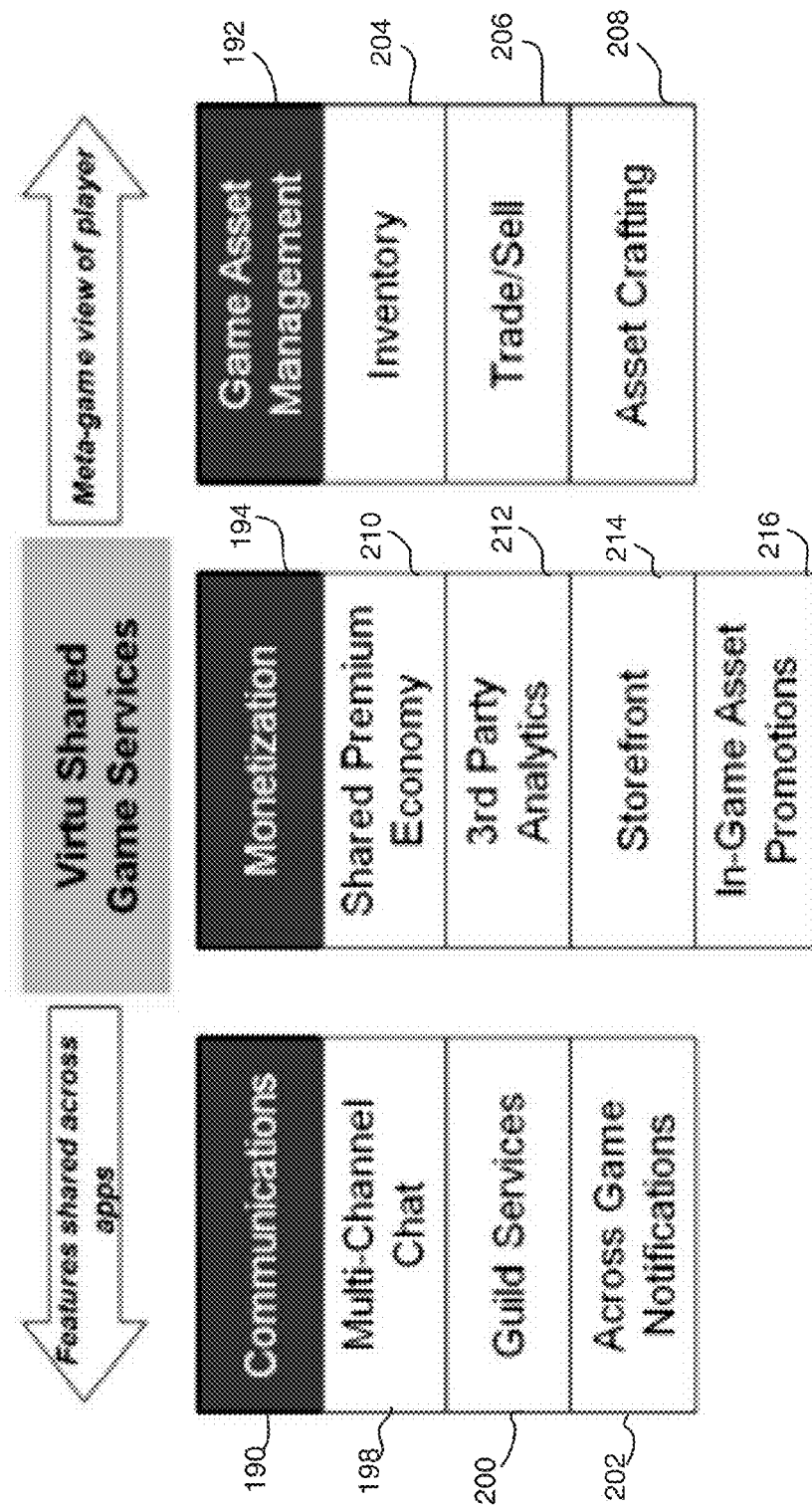
FIG. 8 shows examples of shared services for a digital platform.

Example digital platforms can connect people and gameplay experiences together in new and significant ways, creating an experience where users (in this example, players) invest time playing games with a community of players to compete, achieve, socialize, and add value to gameplay across a portfolio of games. FIG. 8 shows examples of shared services for the digital platform 170. A digital platform backend, such as that shown in FIG. 1, includes a variety of primary services to facilitate cross game and community service delivery. For instance, the digital platform can provide services including communications services 190, game asset management services 194, and monetization services 194. The communications services 190 provide features shared across applications (apps), including but not limited to multi-channel chat 198, guild services 200, and notifications across games 202. Guild services are explained in more detail below. The game asset management services 192 provide a meta-game (i.e., across multiple games) view for the player, and include, but are not limited to, services for managing inventory of digital assets 204, trading/selling services 206, and services for crafting digital assets 208. Monetization services 194 include a shared premium economy 210, third party analytics 212, a web-based storefront 214, and in-game asset promotions 216.

A particular example system and method using a digital platform is configured for long term progression, collection, and social experiences across media channels, which in this example, includes a portfolio of games. The example system and method provides value to players in playing the portfolio of games across an IP universe, or even across a "multiverse" of IP universes. By playing more often and playing across games in the portfolio, players gain more value. Similarly, by engaging with social features, the benefits are amplified. Those of ordinary skill in the art will appreciate that may variations are possible, and that digital platforms, media channels, media sources, and methods are not intended to be limited to those shown and described.

In an example method for the digital platform, the digital platform receives request from users (players) to create an account via, for instance, connecting from a favorite social network, receiving a contact (e.g., email address, mobile number, etc.), or even by receiving a request for a user to opt out of the digital platform to play as a guest with limited functionality. Services in the example digital platform for users are divided into three tiers: 1) guests—those who opt out of the digital platform; 2) members—players who join the digital platform community at a base level of services; 3) premium members—players who have paid for a premium service bundle.

Access to example privileges, including services and/or content for engaging with the digital platform, can be divided into respective tiers for guests, members, and premium members. As non-limiting examples, guests, members, and premium members all can use game applications (apps), shop at on online digital platform store, invite friends to join (with mutual incentives), participate in chats, etc. However, only members and premium members are granted access to: use a cloud save; join meta-guilds; create and manage meta-guilds; use a custom digital platform profile; receive a digital platform profile status; attend meta-guild events; attend digital platform events; access a cross-game asset browser; participate in meta-guild chat, participate in meta-guild upgrades, donations, and member bonuses; set voice chat options; friend chat; make a friend donation; participate in friend cross-game collaboration; receive social network timeline support; make a social network invite with mutual incentives; provide game screenshot "bragging"; receive cross-game achievements; access player vs. environment (PVE) events and player vs. player (PVP) events, access a cross-game asset browser with transference; receive cross-game energy bonuses; attend cross-game gameplay events; receive cross-game daily rewards; receive unique cross-game items with transference; receive seamless cross-game character transference; receive cross-game premium currency and resource transference; participate in the auction house; participate in real-time event and game position reporting; loan characters to a friend or meta-guild member's games; etc. Only premium members can create and manage premium meta-guilds; create custom meta-guild events; and participate in exclusive PVE or PVP events.

Figure 9:
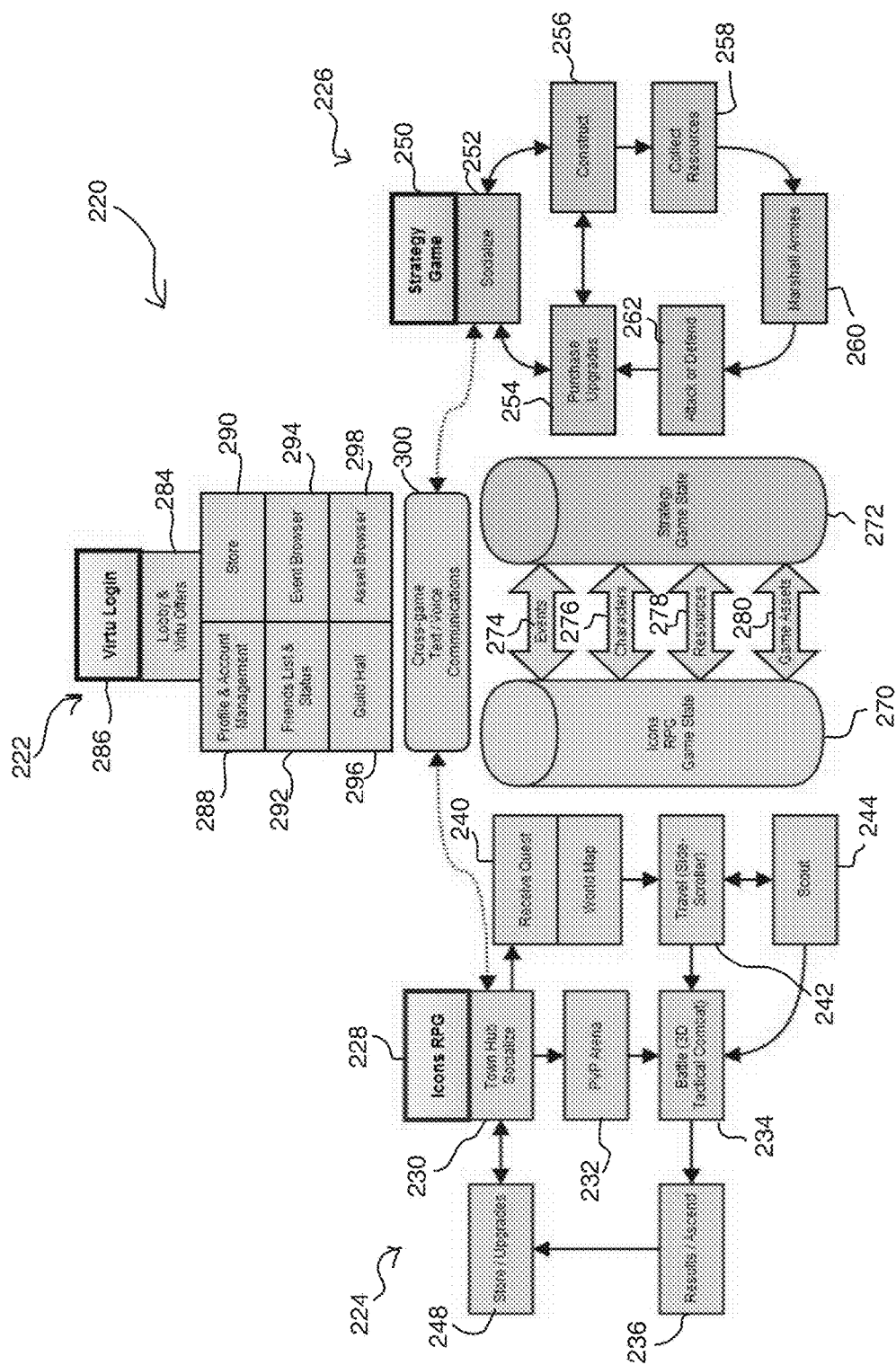
FIG. 9 shows an example system and method for managing an intellectual property (IP) universe using a digital platform.

FIG. 9 shows a system 220 for managing an example intellectual property (IP) universe using a digital platform 222. Though a single IP universe is shown having a portfolio of two games, example digital platforms may support multiple media channels (e.g., games) within the same IP universe as well as cross-IP universe (multiverse) capabilities to support a broad community of players. The IP universe includes a role playing game (RPG) 224 and a strategy game 226.

The example RPG 224 allows a user to navigate to various services. After a login (for example) 228, the user can be directed to a town hub 230, which serves as a beginning area, and allows for players to socialize. The town hub 230 leads to a player-vs.-player (PVP) arena 232, which in turn leads to an event such as a battle arena for combat (e.g., 3D tactical combat) 234. The results 236 of the battle arena events can affect the characteristics of the characters, which are represented by digital assets, and affect the game state of the RPG.

Further, from the town hub 230, the players can receive quests and view a world map 240. After receiving quests or viewing the world map 240, a player can travel 242 to the battle arena 234, or scout 244 the battle arena. From the battle arena 234, the player can view results 232 of the battle, and view or alter characteristics of a player's character. For example, the player can receive an indication that his or her character has ascended to a higher level, with one or more improved characteristics. A store 248 for acquiring or purchasing upgrades, including but not limited to acquiring or upgrading characters, resources, game assets, etc., is navigable from the town hub 230, and after viewing the results of the battle.

The example strategy game 226 includes, after a login (preferably) 250, a hub or lobby 252 for socializing, which navigates to an area for acquiring or purchasing upgrades 254, or to an area for constructing a character 256, which can also lead to acquiring or purchasing upgrades. Such acquired or purchased upgrades can include, as non-limiting examples, characters, resources, and game assets. After constructing or upgrading a character, a player can collect resources 258, marshal armies 260, and attack or defend 262 within the strategy game. Attacking or defending 262 in this example generates events and affects the game state of the strategy game.

The digital platform 222 provides a bridge between both example games 224, 226 (or with other games in the IP universe or cross-IP universe). Particularly, the example digital platform 222 stores a game state 270 for the RPG and a game state 272 for the strategy game, e.g., within data storage. Using the digital platform, events 274, characters 276, resources 278, game assets 280, etc. can be shared between the RPG 270 and the strategy game 272. The events 274, characters 276, resources 278, and game assets 280, or a portion of one or more of these, can be reflected by or provide the game states 270, 272, and these game states can be represented as digital assets. Alternatively or additionally, any one or more of the events, characters, resources, or game assets can themselves be represented by digital assets. It will be appreciated that the separate games 270, 272 may maintain respective game states, events, characters, resources, game assets, etc., and that portions of these may be shared between the games. Alternatively, complete game states, events, characters, resources, game assets, etc. may be shared between the games 270, 272 using the digital platform 222. This allows digital asset data to be provided to multiple media sources (e.g., computers enabling performance of the RPG and strategy games), and for performance of the media (e.g., game performance) to be affected by the digital asset data.

The digital platform 222 also includes a lobby 284, which is accessible by a login page 286 or other suitable web-based portal. The lobby 284 includes a cross-game interface. From the lobby 284 (or otherwise), a player can access his or her profile and account management 288, a store 290, a friends list and status 292, an event browser 294, a guild hall 296, and/or an asset browser 298, examples of which are described below. Preferably, the digital platform also includes cross-game text/voice communications 300 in connection with both the RPG 224 and the strategy game 226.

In an example operating method, a core loop includes players logging into the digital platform lobby 284 to check their progress and goals, connecting with friends, participating in guilds, reviewing the latest cross-game opportunities, and/or participating in game play in either the RPG 224 or the strategy game 226. The digital platform lobby 284 may be accessible either directly or via either or both of the games 224, 226 (such as from the hubs for either game, or from other services).

For example, at an initial launch of the RPG game 224 or strategy game 226, a splash screen (not shown) for the game can appear. If a player has not previously logged into the digital platform 222 network, a login page 286 to the digital platform may be presented to the player via the RPG or strategy game (e.g., via the hub). Once the player has previously logged into the digital platform network, upon an initial launch of the RPG or strategy game the player is preferably auto-logged into the digital platform network, and can be directed to the lobby 284. However, the particular methods, pages, locations within the games, etc., for logging into the digital platform network can vary as will be appreciated by those of ordinary skill in the art. The digital platform network interface may be presented to the user as a new screen (e.g., launching in a web browser), as a launched new app (e.g., for a mobile or other device), as an overlay, as a frame, as a pop-up or pop-under screen or other separate window, as an interface resting "above" the current game, or otherwise.

Upon receiving login information, the example digital platform preferably loads the player's profile, checks for content updates in a downloadable content (DLC) system, and provides (e.g., displays) news and event notices for the current game, (the RPG or strategy game in this example). Preferably, players are automatically provided a view of their last played game position. For example, in the case of the RPG 224, the last played hero character can be displayed on the screen, along with the current quest, potential goals, achievements, and most recent significant accomplishment. This helps orient the player to the new game session in an accessible way. Players who have acquired the ability to play more than one hero (e.g., by purchasing the ability) can also be permitted to select a different hero and see the interface update to reflect that hero's game position. New players can be presented with a different and new user experience that helps to bring them directly into game play as quickly as possible, as will be appreciated by those of ordinary skill in the art.

Figure 10:
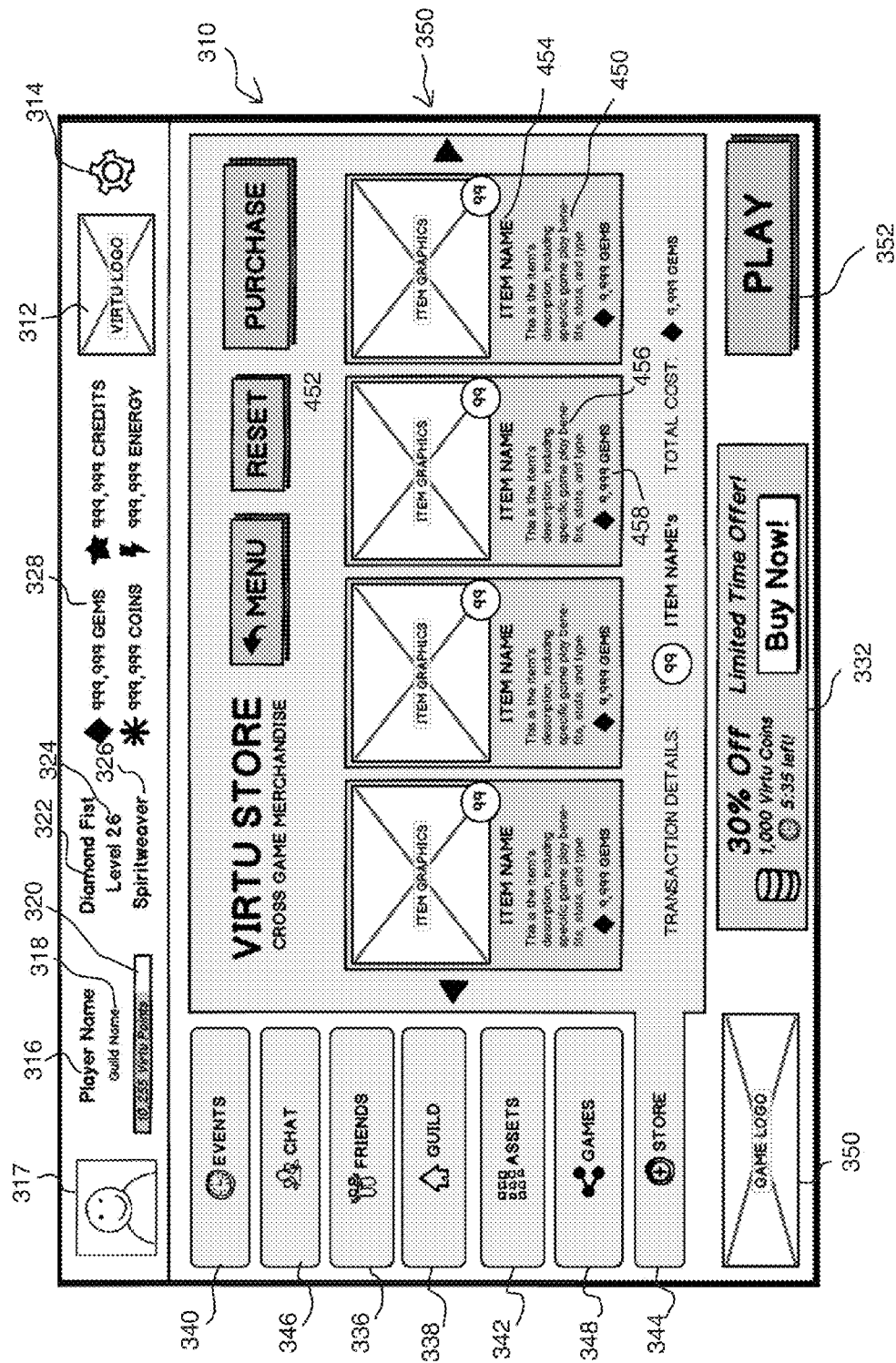
FIG. 10 shows an example cross-game interface displayed on a portal, in which a store tab is selected.

FIG. 10 shows an example cross-game interface 310, which may be presented within a web browser, mobile app, console app, etc. The example cross-game interface 310 is common to all digital platform games in the example IP universe, and can rest "above" the gameplay portion of each game. The layout may be standardized, but may alternatively or additionally be skinned/colorized based on the user interface (UI) requirements of a particular game. It will be appreciated that the cross-game interface 310 shown in FIG. 10 is an example, and other cross-game interfaces according to embodiments of the invention may vary from that shown. The cross-game interface 310 or other interface enables a user to access at least a portion of the digital asset data for at least one of the stored digital assets.

In a frame (for example), a logo 312 for the digital platform and a widget, clickable icon, or link 314 for accessing a player profile area (profile area) can be provided in the cross-game interface 310. A status area on the frame displays a player name 316, picture 317, guild name (if any) 318, and accumulated points 320 earned or otherwise acquired within or for the digital platform. The status area further includes information for a player's character (hero), including name 322, level 324, type 326 and assets 328 such as gems, coins, credits, and energy. A game logo 330 for the player's current game (i.e., the game from which the digital platform interface launched) and advertising 332 may also be provided.

Tabs (or other selectable widgets) are provided in the interface for accessing other areas providing various services of the digital platform. Example areas, and tabs, can correspond to the digital platform services shown in FIG. 8. The example tabs include a friends list tab 336, a guild hall tab 338, an events tab 340, an asset browser tab 342, a store tab 344, a chat tab 346, and a game apps tab 348. In the interface 310 shown in FIG. 10, the "store" tab 344 is selected, and a store interface 350 for providing store services is shown. A "play" button 352 or other suitable widget is also made available to allow a player to quickly jump into a game.

Example cross-game services will now be discussed. In the profile area, each player has access to a profile that quickly represents the player within the digital platform system. The profile tracks an aggregated point total of all achievements, participation credits, and status within the digital platform system. Unlike traditional achievement scores, example digital platform achievements provide a unique point system that consider social statistics and participation as well as achievements and numbers of assets collected. Within the profile area, a player can create a unique identity and select from a list of pictures to represent themselves. Other pictures preferably can preferably be unlocked and collected over time. A profile badge can also be bordered with special colors, trim, etc. depending on the player's status within a community. In an example embodiment, a profile title can be earned and selected for players with high levels of achievement, participation, and/or social standing. A user's status, for example tiered, leveled, or other status, can be determined by the digital platform by accessing the user's stored profile, and services or content can be presented to the user based on the determined status, examples of which are presented herein.

An example profile page (not shown) includes a list of each game within the particular digital platform network that has been played. In an example profile page, this list is presented via displayed cards, highlighted by artwork and a logo for each game played. A simple meta-score summary or progression bar can also be provided, showing how far through the game's available collections, progressions, and achievements the player has earned.

Players preferably can access their achievements earned across all games in the digital platform system from the profile area. In an example embodiment, players can also access platform specific options, such as Game Center (iOS), Google Plus Game Services (Google Android), or other options. Various account management settings can also be accessed from the profile page, examples of which will be apparent to those of ordinary skill in the art.

Another page (not shown) for the friends list area displays current friends, suggests friends in a player's social graph (and can provide incentives for inviting them), and preferably further displays a live play status of friends that are currently playing a game on the digital platform. "Friends" as used herein refers to friends as understood for social network platforms or social applications. In an example embodiment, players can login to the friends list area separately, e.g., using social websites such as Facebook, gaming services such as Game Center or Google Plus Game Services, or simply by providing an email address to create a digital platform ID. Other authentication services, such as but not limited to services for short messaging platforms such as Twitter, photo-sharing sites such as Instagram, or other territorial social graphs, can be provided as well. Because a player can potentially login with different accounts (either intentionally or accidentally), an example digital platform provides a master ID that allows inheritance of multiple authentication tokens (auth-tokens).

Depending on which social network(s) are linked by the player to the digital platform account, the example friends list area can provide a list of friends matching the player's social graph that also have digital platform IDs. This list can be prioritized and highlighted based on players who are "active;" e.g., have more recently and/or more frequently participated in the digital platform. Such highlighted players can be connected as a friend simply by pressing an associated "invite" button that is provided. Preferably, the friends list area also provides a "send invite" option for players not shown in the list, so that players can invite friends into the digital platform.

Incentives can be provided in example embodiments for players to invite friends into the digital platform network. Such incentives can accelerate virality of the digital platform. Many incentives are possible. An example incentive method provides a consumable asset for use within games in the IP universe that resets an energy characteristic for one play session. Other example incentive methods include, but are not limited to, providing bonuses such as digital currency bundles, profile status highlight, exclusive assets, etc. Incentives can increase progressively for players who reach invite thresholds, e.g., 10, 25, 50, 100, etc. invitations into the digital platform network.

Each player that is connected into the player's friends list is enabled to access and participate in a variety of significant services. Example services include, but are not limited to, private chat, gifting, asset trading, guild invites, live status sharing, and/or the ability to unlock special digital platform friends services within each game. As a non-limiting example, the digital platform interface can allow players within the RPG can appear in the same town hub instance and visually see and chat with each other's hero if they have been joined as friends within the digital platform system. Friends and guild mates may also be permitted to join together in multiplayer PVP arena battles.

Players preferably have access to a cross-game communications system that provides (e.g., free) text chat with private, local, and guild communications. In an example embodiment, players may also acquire (e.g., purchase) the ability to unlock a voice chat system that functions similarly to "walkie-talkie" style voice communications.

Another area, the guild hall area, enables players to virtually form and join designated player groups, or guilds, though other interfaces can be used. Guild can jointly participate in activities, such as PVP or PVE events (or other events), share digital assets, associate with other members of the guild (guild members), etc. Those of ordinary skill in the art will appreciate that other activities for guilds are possible, and these are intended to be part of the scope of the present invention. However, as opposed to conventional guilds, the guilds provided by example digital platforms reside "above" multiple games within an IP universe or multiverse, due to their management by the digital platforms associated with these games. Such guilds according to embodiments of the present invention are thus referred to as "meta-guilds" herein. Meta-guilds can participate as guilds in each of multiple games, and acquire and upgrade digital assets for the meta-guild, or for individual players within the meta-guild, via each of these games. As described below, various metal-guild services can be made available based on a tiered system, e.g., "basic" and "premium" levels of access.

In the guild hall area, meta-guild founders can set basic permission levels of meta-guild members, such as who can invite new members, update news feed messages, modify guild profiles, adjust permissions, access cross-game guild assets, etc. Preferably, the digital platform also provides simple, default rules and procedures for how to address meta-guild founders who stop participating, how new meta-guild leadership can inherit control, how to pass control of a guild to members, how to dissolve a meta-guild, etc. Such rules and procedures can be similar to those for conventional guilds, as will be appreciated by those or ordinary skill in the art, but apply to multiple games.

In the example digital platform interface, meta-guild members can access the interface to view a list of all meta-guild members' current statuses, preferably in a similar manner to the friends list. This meta-guild members list shows what games the meta-guild members are currently playing (or last played and time), and shows their current digital platform score. The guild hall area can also provide an option for players to donate to their guild. Donations can be, for example, in premium currency (e.g., virtual currency or real currency), and can earn players status within the guild and provide a (e.g., small, temporary) bonus to all guild members, depending on the guild level achieved. Higher numbers of guild members with higher donation levels can earn greater bonuses based on the guild level achieved.

In an example digital platform, meta-guilds can gain levels. When they do, the meta-guilds gain status and prestige within the guild community. Their presentation within the guild browser (the guild hall area, as explained below) can be highlighted with a special border treatment depending on their level, and significant guild achievements can be highlighted in the digital platform's news systems for all players to see. Other indicators can be used as well.

Figure 11:
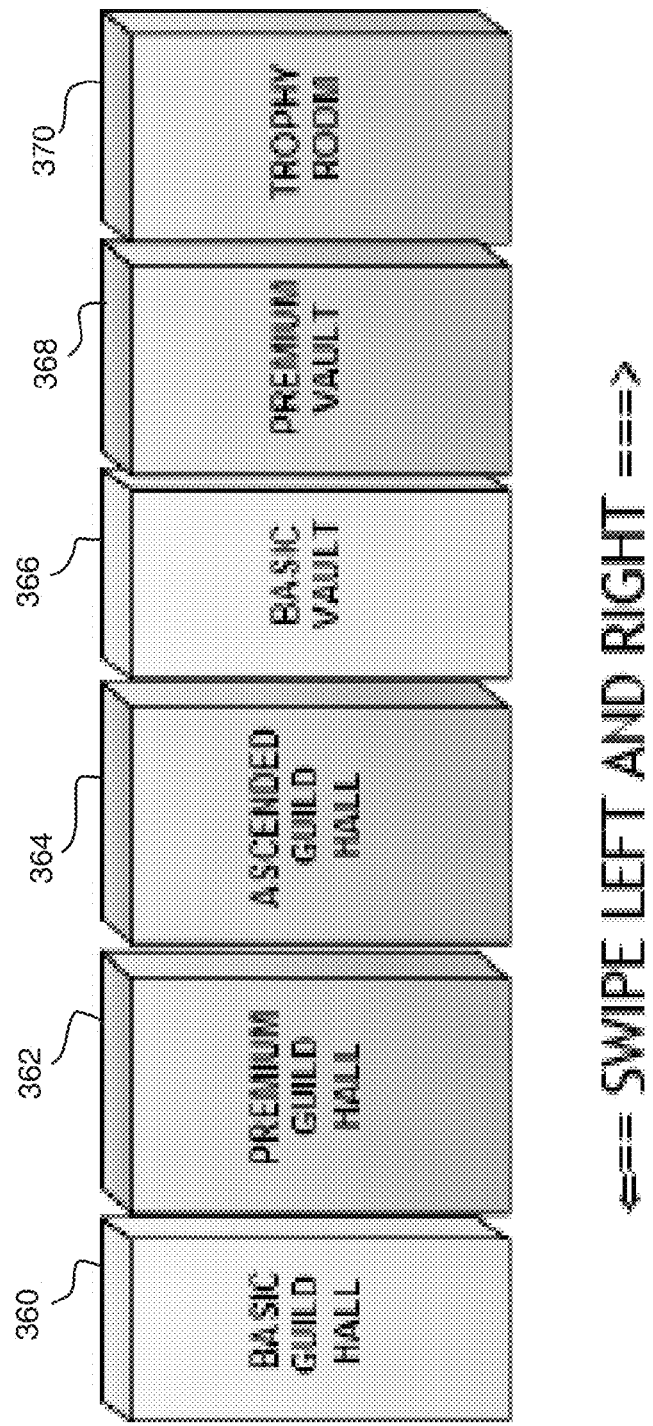
FIG. 11 shows an example portal-based interface for navigating among services for meta-guilds.

From a user interface/user experience (UI/UX) perspective, an example meta-guild system can be presented in a visual context with suitable backgrounds, such as but not limited to 3D environmental backgrounds for each "module" in the meta-guild hall being viewed within each game, as shown in FIG. 11. Example modules include a basic guild hall 360, a premium guild hall 362, an ascended guild hall 364, a basic vault 366, a premium vault 368, and a trophy room 370. Using this example interface, players can simply swipe left or right, and the interior of the meta-guild hall will scroll and display each room that has been unlocked. With inertia, the interior preferably scrolls and stops, and a depiction of the player's hero quickly appears, e.g., with a UI overlay. After the desired room has been selected by swiping left or right, a scene zooms in, the background fades/blurs, and the player's character is framed on one side of the scene presenting the UI options overlay.

In the example guild hall area, access to the basic meta-guild hall (basic guild hall) can be purchased for a small amount of premium currency. The basic meta-guild hall preferably is intended for players who want to sample the guild services and connect with a small group of friends online. It is also possible that access to the basic guild hall could be made available without purchase, such as for promoting a service or the digital platform, or as a reward. Services and modules available to the basic meta-guild hall can be limited. For example, only access to the basic meta-guild hall and the basic vault may be available, along with basic leadership functions, such as invite or donate. A basic meta-guild vault can include, for instance, a storage area, and options for donating, browsing, storage upgrades, or basic storage management. Basic guild halls may also be limited to a (configurable) low number of members. Rooms and services within a basic meta-guild hall include guild chat, a roster display, and guild management (e.g., invite, promote, demote, expel, etc.).

In the example digital platform, players can purchase or otherwise acquire access to the premium meta-guild hall (premium guild hall) to unlock additional (or even a majority of) room upgrades and services. Preferably, acquiring access to the premium meta-guild hall allows premium upgrades and services to be acquired with a single purchase, though this is not required in all embodiments. Premium meta-guilds can be provided, for instance, for meta-guilds that intend to grow a large community of members, run meta-guild events, and compete with other metal-guilds. An example premium meta-guild can have a unique selected name. A premium meta-guild founder can design or otherwise provide a custom emblem for display by other players. Premium meta-guilds preferably can participate in all meta-guild events (PVP, PVE, custom, etc.)

Figure 12:
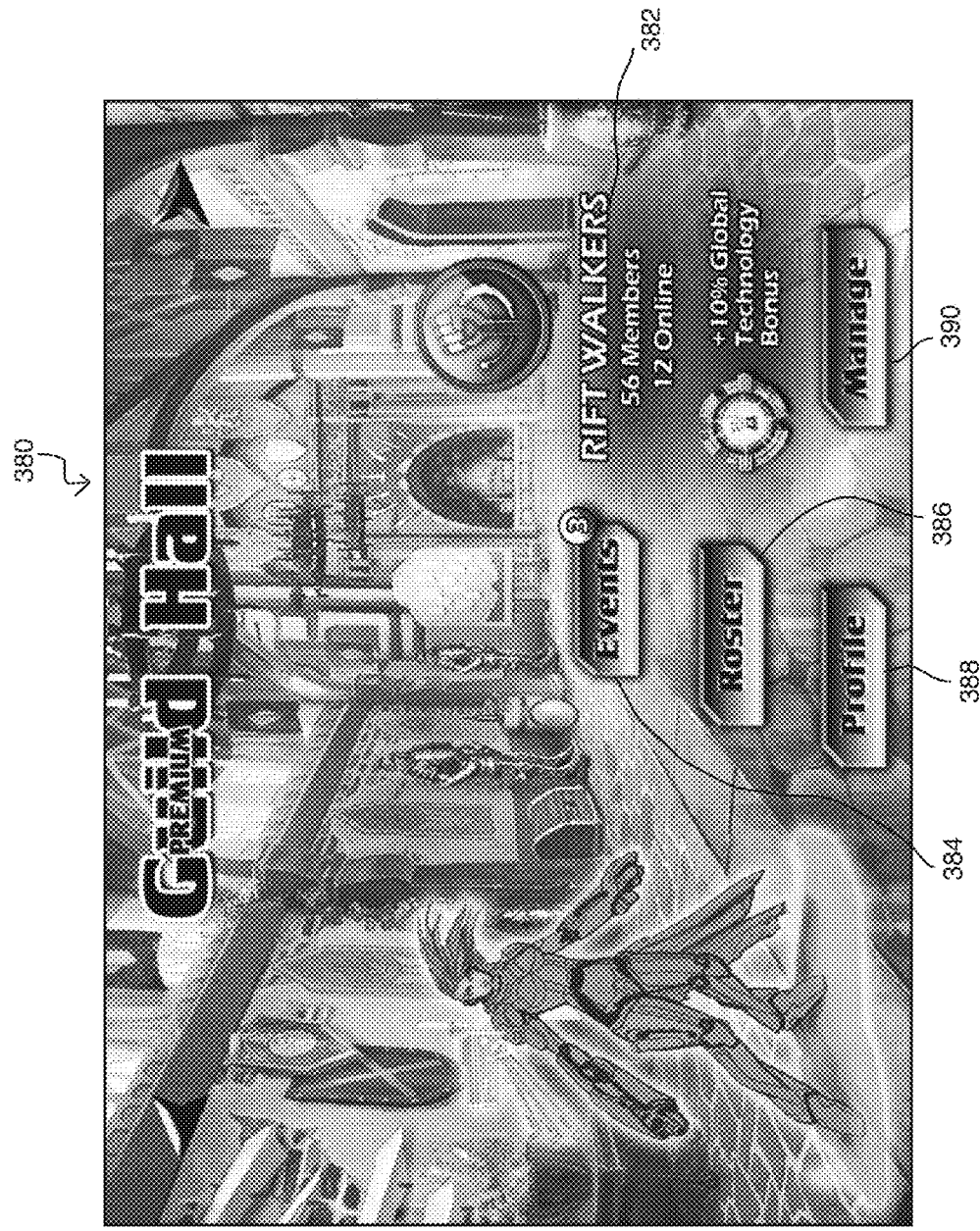
FIG. 12 shows a meta-guild hall in a portal, including a meta-guild summary.
Figure 13:
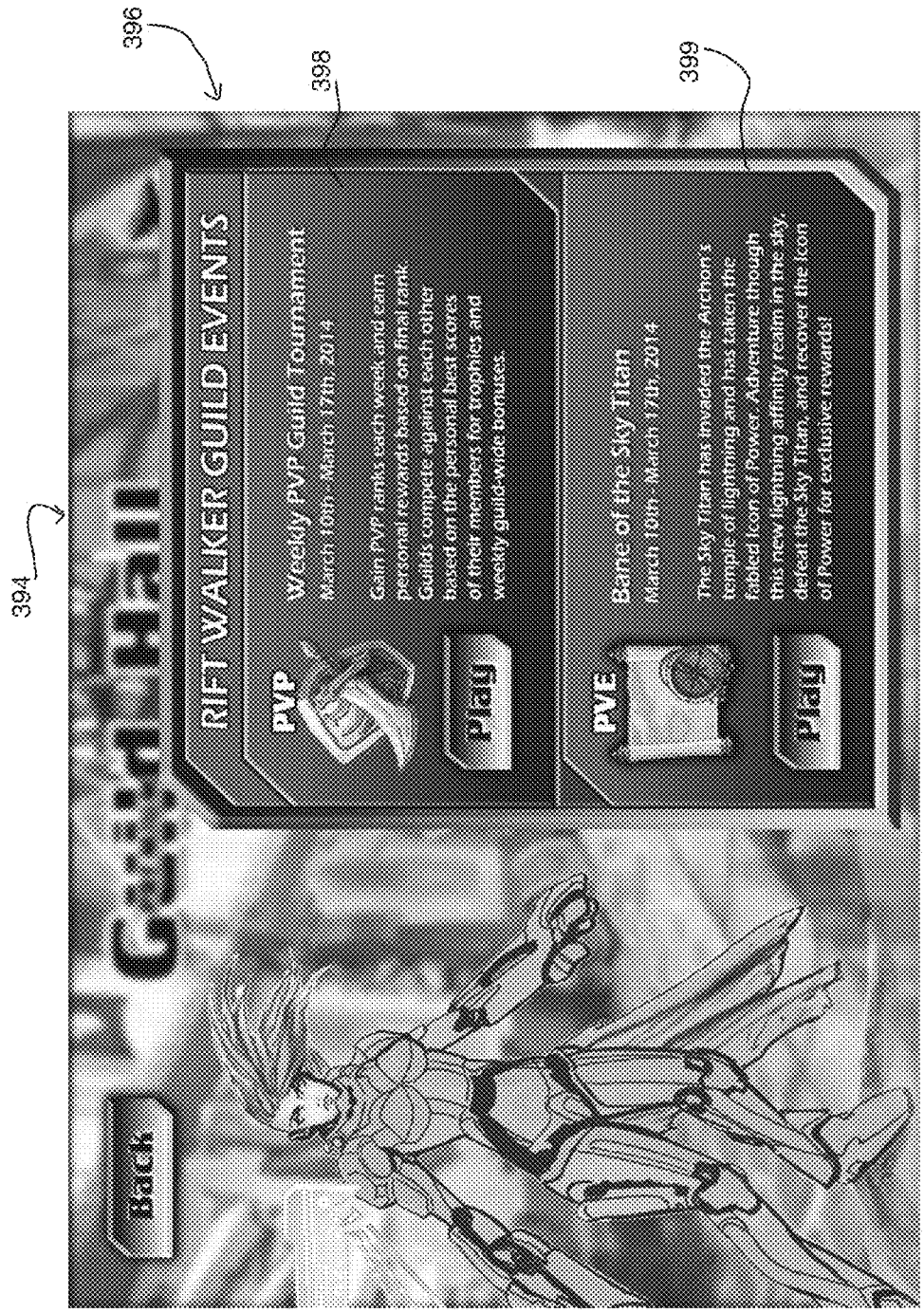
FIG. 13 shows the meta-guild hall, including possible events for the meta-guild.

Example displays for a premium meta-guild hall are shown in FIGS. 12 and 13. A display for a basic meta-guild hall can be similar, but with access to premium services removed. In FIG. 12, the example display 380 appears with a 3D view of the meta-guild hall and a meta-guild summary 382. The display also includes options to access events in which the meta-guild can participate 384, the meta-guild roster 386, and a complete meta-guild profile 388. In the example display 380, the "events" icon 384 includes a badge number of "3", which indicates that three new events are available. The meta-guild summary 382 includes the meta-guild name, emblem, and a bonus applied to all members of the meta-guild. Meta-guild leaders can also have an extra "manage" selection 390 to access services for controlling guild leadership-specific functions. When the "events" icon is selected, the display 380 is switched to the display 394 in FIG. 13, an events screen 396 overlays over the meta-guild hall view, and the background is blurred. Example events, which in this example are PVP weekly events 398 and player versus environment (PVE) special events 399, are shown on the example display 394.

Example rooms and services in the premium meta-guild hall include meta-guild chat, roster access, premium meta-guild management, and event management. Premium meta-guild management can include membership control (e.g., invite, promote, demote, expel, leadership transfer, individual permission settings based on multi-level meta-guild rank, etc.), news of the day, or access to a custom meta-guild name and banner (or logo, crest, etc.). Event management can include participation in meta-guild PVP tournaments, participation in meta-guild PVE events, or creation of a customized meta-guild event.

Figure 14:
FIG. 14 shows a display of a meta-guild vault.

Premium meta-guilds preferably also have access to the premium vault, an example display 400 for which is shown in FIG. 14. Options made available in the premium vault include, as non-limiting examples, storage (e.g., donate, browse, etc.), storage upgrades, or premium storage management, as well as options for donating 402, browsing 404, or managing 406 assets. A trophy room preferably is also available to the premium meta-guilds. Premium meta-guilds preferably have a larger vault than basic meta-guilds, and the premium meta-guilds are able to allocate daily limits for withdrawals of different item types for each promotion level of the meta-guilds' members. Providing access to the vault for users in meta-guilds is another way of facilitating exchanging of digital asset or digital asset data among users.

Referring again to the example UI shown in FIG. 11, players can swipe left and right to both navigate across the meta-guild hall rooms and scroll through all selection lists. For example, the player can swipe left to find the meta-guild vault, as shown in FIG. 14. The background can quickly snap into place with inertia, and a visual depiction of the player's hero can be displayed, introducing the room selection and available options. Other UI/UX features, such as but not limited to sound effects or voices, can be provided during selections as well.

A (first party) event system is a significant part of mobile games to keep the community engaged and provide limited time monetization opportunities. Such a system, however, requires a live event infrastructure to be provided, and a live operations team to manage it. Despite this, successful mobile games, such as card and multiplayer online battle arena (moba) games typically include some form of periodic events, including weekly, or even daily events, or other scheduled (or provided according to predetermined criteria, or random) events to engage players with new content and provide opportunities for players to return.

An example digital platform system can affect multiple games as well as within a specific game, creating unique or special events by providing data to affect the game state of multiple games. Game states may be affected (e.g., altered) for particular users, groups of users (e.g., groups of friends, guilds, meta-guilds, select portions of guilds or meta-guilds, a gaming community as a whole, etc.), or any combination of these. Such data can affect (including altering, adding, or even deleting) events, characters, resources, game assets, etc. As a non-limiting example, the digital platform system can provide an event in which an "affinity of metal" surges through various rifts, providing bonuses to "Metal" icons and a surge of "Metal" creatures across all encounter areas in the RPG. A special boss, e.g., a "Titan" boss, can be behind this surge. Further, this Titan boss and "Metal" army can also invade the strategy game, providing content across games. In a particular example, by defeating the "Titan" in both (or more) games, a player can be provided with special rewards unavailable to players that only defeat him in a single game (or in fewer games than the total number available). Due to the cross-game configuration of the example digital platform, these special rewards can be applied to an aspect of the meta-game profile, or to aspects of one or more of the games. Staged content within one virtual world (e.g., game or group of games) can be completed by a community, a group, an individual user, etc., by triggering an event to another virtual world, which unlocks content, game states, digital assets, etc. as a result.

In an example digital platform, game play actions performed by a player in one game can affect and often greatly enhance the rewards and bonuses in game play of other games within the IP universe (or across IP universes). Referring again to FIG. 9, an example digital platform 222 manages this by the player being logged into the digital platform on both games 224, 226. In this way, both the game state of the RPG game 224 and the game state of the strategy game 226 are continually updated, e.g., in the cloud. Data for events 274, characters 276, resources 278, game assets 280, etc. can be shared or exchanged between the game states 270, 272 of both (or more) games. Specific events within each game can trigger a cross-game event to execute, which in turn can update the player's position and bonuses in other games. As explained above, events occurring in multiple games (e.g., in which the players participate) can further provide special bonuses in some embodiments. In this way, a plurality of virtual world states can be connected, and the one or more virtual worlds can be altered (for particular users, for a group of users, for an entire community, or in any combination) based on one or more cross-game events triggered within one or more of the games.

Additionally, players who have joined together with friends and/or a meta-guild can gain new dimensions of cross-game events. For example, players can collaborate to achieve major bonuses, time, currency, and play value.

As a non-limiting example, each player's avatar can have a game state that can affect the game states of other players within that game, and may also affect some or all games within an entire IP universe or multiverse. The game state changes can be triggered, for instance, via activation of a digital asset, game play accomplishment, by players working together to accomplish a social gameplay objective, etc. A world state can also be altered, e.g., by live operation staff with remote tools, by an algorithm, etc.

As a non-limiting digital asset example, a player can activate a digital asset which alters one or more characteristics of the game world for all players in one or more games within an IP universe. As a non-limiting game play example, a player can defeat a boss in a quest that results in that region of the world being "safe" and free from enemies for a period of time for all players in one or more games within an IP universe. As a non-limiting social objective example, a player can participate with meta-guild members in one or more games within an IP universe to accomplish gameplay objectives in order—e.g., defeat an army, breach a castle gate, complete a quest to defeat the boss within—and acquire an exclusive digital asset.

As a non-limiting example of live operation staff remote tools, a player can speak to a non-player character (NPC) prophet when suddenly a flaming meteor streaks through the sky, landing with an explosion that causes a volcanic mountain to erupt. Fire and lava sweep through a region of the world, unlocking new limited-time fire-themed content and altering the world for all players across all games in an IP universe. In this example, live operations event staff triggered the events to happen using live event software tools that affect game states across one or more games in an IP universe.

Figure 15:
FIG. 15 shows a display for an example asset browser.

The example digital platform's asset browser services allow players to view all (or a selected portion) of the cross-game and/or cross-universe game assets, represented by digital asset data, that have been collected or that are available to be unlocked for use. By providing the asset browser and the store, the example digital platform enables users to view, purchase, donate, trade, and auction digital assets such as game assets, among other services. An asset browser can also show similar game assets that apply only to individual games. FIG. 15 shows an example UI display 410 for the asset browser. The asset browser interface includes tiles 412 representing various game assets. Assets are organized by heroes 414, familiars 415, icons 416, and items 417. "Back" 420 and "All" 422 selections are also available.

Filters and search capabilities 424 can be provided to allow players to quickly narrow the list of available game assets for tailored browsing. There can be an option to further filter the list of game assets down to specific types of assets so that, for instance, a player can view only all heroes that are available between the RPG 224 and the strategy game 226 with a small number of taps (e.g., tap each game card, then the "Heroes" filter button 414). This example method allows a player to view all currently unlocked/collected heroes that can be played in both games. The example asset browser also shows the player all possible options with an indicator (e.g., a greyed out background) to convey that these heroes are available to unlock in the future.

Figure 16:
FIG. 16 shows a display for a zoomed-in asset within the asset browser.

Selecting one of the tiles 412 (or other cards) in the display of FIG. 15 (e.g., by tapping or clicking on the tile) can cause the tile to quickly zoom to the front of the screen to the state shown in FIG. 16. A "zoomed-in" asset tile 412 can depict a detailed record of the asset, including its statistics 430, bonuses, and a general trade value 434. The player is also preferably presented with artwork 436 for the game asset. In an example digital platform, some member privileges (premium member status, or premium meta-guild manager, for example) allow players to gift or donate game assets directly from the asset browser interface.

Though each item 412 shown in FIG. 15 is unique, multiples of the same item can be displayed. A badge number overlay can be provided for indicating multiple items. The asset browser display may also show, for instance, whether the game asset is local to the current game, or global across games (or a subset of games).

In the example display shown in FIG. 16, options are made available for the player to take 440 (or unlock) the asset represented by the tile, or to transfer 442 the asset. For instance, players can be presented with an option to immediately unlock some of these heroes with an instant premium currency purchase. In an example digital platform, some rare or "epic" level assets can only be unlocked by playing both (or more) games to a certain progression or achievement level. Such rare or epic level assets can be set off from others in the asset browser display, e.g., highlighted with special border treatments, and the requirements to achieve them preferably are clearly communicated to the player so they can be driven to try and achieve that asset. Players can be allowed to select certain game assets they want to "track" so that the player can know their progress and see UI elements that help them achieve desired game assets.

The example asset browser provides players with a useful visual browser of all of the players' cross game assets and optionally other available assets. Further, and similar to the example profile page, the example asset browser can also include a scrolling list (not shown) of all digital platform games the player has played in, along with a list of possible digital platform games that have not yet been downloaded (e.g., from an app store). Selecting (e.g., tapping) these unplayed games can launch the app store to allow the player to immediately download the games and activate them, e.g., with their digital platform ID login.

Preferably, the digital platform interface also enables viewing the compatibility of particular game assets with particular games. In an example embodiment, the asset browser includes a scrolling list of cross game assets (not shown) provided below (e.g., immediately below, but not necessarily) the scrolling list of game cards. By selecting a particular card, players can view assets from that game. Selecting more than one game allows the player to see all assets that are compatible with the games selected. The more games that are selected, the fewer game assets that are likely to be compatible across all of the games. Preferably, players can quickly toggle the displayed list of digital platform games on and off by tapping the card.

Players preferably can transfer assets gained in one game into another. Such transference items can have, for instance, a universal digital platform icon marked on them in a small, but consistent and noticeable way. The transference items can be obtained within an individual game, but preferably show up in the asset browser and are available to transfer to one or more other games associated with the digital platform. Some game assets may be universal to all digital platform games, such as but not limited to currency, resources, digital platform status, and vanity items. Some game assets may be very specific to game play or combat, for instance.

Once a game asset is collected in a game, the asset is stored within the game state of that game, and thus within the data storage of the digital platform 222, as described above. When the player visits the asset browser, the new collected item preferably can be clearly highlighted on the asset browser UI (e.g., dashboard), along with any other items pending transfer. By receiving a user selection for the item and a selection to transfer the item (e.g., via the icon 442 shown in FIG. 16), the item can be transferred to the game state of another game for use within that game.

In an example embodiment, the item may (but need not in all cases) cost "energy" in the destination game to transfer. If sufficient "energy" is not currently available to the player, the digital platform can allow the player to immediately purchase extra energy within the asset browser, e.g., by performing an additional tap on (or otherwise select) the item's purchase energy UI popup, or by otherwise receiving a request to purchase the energy. Items can be clearly marked with different power levels. Such levels can be, as non-limiting examples, common, rare, epic, and legendary (or other appropriate designation of increased power). In an example embodiment, items of higher power levels cost additional energy to transfer to a destination game.

In the example store, players can be presented with special offers exclusive to the digital platform network and cross-game play. Such offers can include, for instance, limited time currency and resource bundles, "rare" collectible characters only available through the digital platform interface (that is, not available inside the game), guild bundles that boost guild members for a period of time, consumables and power-ups that provide boosts to game play for a limited time, "rare" aesthetic upgrades for heroes or familiars, new icons, etc., that are made available only through the digital platform offer panel.

Players can also be able to purchase cross-game currency or resource bundles with increasing discounts for higher volumes. In an example embodiment, periodically, a "limited time offer" with a countdown clock can be presented to provide a larger discount or bonus coins for converting at that moment in time. This can be presented, for instance, during a time when the player needs coins the most. Because cross game premium currency may need to be converted into local game currency in some instances, an example digital platform can include flexibility to tune economies uniquely so that inflation/deflation issues are not introduced (or at least are limited) from one game into another economy. For example, a conversion rate into local game economies can be used. Alternatively or additionally, a separate cross-game premium currency can be provided with a unique cost for each premium item, as well as a local currency with its own cost.

Referring again to FIG. 10, an example store UI 350 includes a list of items represented by cards/tiles 450. Each card/tile includes a (preferably unique) item graphic 452, an item name 454, description 456, and cost 458 (in cross-game currency or local game currency, or in real money). Transaction details can also be displayed.

The example store UI 350 provides options for players to purchase benefits across all games in the digital platform. This can include, for instance, purchasing boosts that only work in cross game play situations. For example, by playing both the RPG for 15 minutes and the strategy game for 15 minutes within a 24 hour period, a player can gain free energy resets for both games, a stat boost, and a special status effect that causes the displayed hero to glow with "energy particles" in social and game play areas. In another example, purchasing an "epic Titan" boost can allow players who play within one game to progress summoning counters in all digital platform games, allowing for, say, double the normal speed of "epic Titan" cooldown timers.

In particular games in an example digital platform, game-play costs PVE energy, which restores over time. If the player is low on PVE energy, a separate PVP energy store can be provided that depletes when the player competes in a PVP arena battle. Once both energy meters are depleted, the player may continue to socialize, shop, purchase additional energy, etc. Playing in other games associated with the digital platform can provide bonus energy to the player. If managed properly, the player could potentially switch back and forth between some example digital platform games without much downtime. However, some downtime may still be required, for instance to encourage the player to purchase more energy.

The store UI 350, or a different service area in the digital platform interface, may provide access to an auction house, as described above, where players may post a (preferably limited) number of items for sale in an auction format. When items are posted, the items can be communicated to other players by suitable notifications (e.g., icons, alert, push notifications for "wish list" items if a players opts to receive them, etc.) when the players are accessing the digital platform, or by other communications, such as email or instant messages. A "quick buyout" option can also be provided within the auction house for a player to pay a set price in lieu of an auction. Players may purchase the ability to post additional items on the auction house, potentially increasing their game currency profits.

In an example digital platform, a list of available game universes preferably appears with each game within that IP universe, such by a user selecting the game tab 348 on the user interface 310. This list is preferably clearly advertised within the game. The example digital platform tracks which digital platform apps have been installed, and can route the user either to the appropriate store (e.g., app store) to install the app, or it can automatically launch the app if it is available locally on the user's device. Users can be offered immediate and daily incentives for playing in additional digital platform game apps.

Players can be provided with push notifications of, as non-limiting examples, events, energy replenishment, significant guild events, friend requests, and fictional "calls to action" to bring players back who have not been playing for a specified period of time. Identifiers, such as but not limited to badges or where appropriate on other platforms, can appear over an application icon on a user's device. Players may opt-out of push notifications if they wish.

While various embodiments of methods and systems for managing digital assets have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for managing a stored digital asset on one or more computers independently of a plurality of media sources, the plurality of media sources performing at least different first and second media, the digital asset being represented by digital asset data, the digital asset comprising a plurality of characteristics including at least one alterable characteristic, the digital asset comprising one or more of a virtual character, virtual property, or a game asset, the method comprising:
sending at least a first portion of the digital asset data to a first one or more of the media sources including at least one alterable characteristic, whereby performance of a first media by the first one or more media sources is affected by the at least one alterable characteristic;
receiving data from the first one or more of the media sources for altering the at least one alterable characteristic based on the performance of the first media and independently of a performance of the second media;
altering, by the one or more computers, the at least one alterable characteristic in the stored digital asset based on the received data to provide updated digital asset data having at least one altered characteristic;
sending at least a second portion of the updated digital asset data including the at least one altered characteristic to a second one or more of the media sources independently of the performance of the first media, the second one or more of the media sources being either the same media sources or different media sources from the first one or more of the media sources, whereby performance of the second media by the second one or more media sources is affected by the at least one altered characteristic.

2. The method of claim 1 wherein the second one or more of the media sources are different media sources from the first one or more of the media sources.

3. The method of claim 1, further comprising:
storing and updating the digital asset by the one or more computers.

4. The method of claim 3, wherein the one or more computers are remote from the plurality of media sources.

5. The method of claim 1 wherein the first and second media are respectively associated with different media channels;
wherein the media channels are taken from the list consisting of video, audio, interactive media, non-interactive media, advertising, electronic books, applications, and social media.

6. The method of claim 1, further comprising:
enabling communication between the one or more computers and a plurality of users independently of the performance of the first and second media to facilitate exchanging of the digital asset or the digital asset data among the users.

7. The method of claim 6, wherein said enabling communication comprises providing a portal accessible to a plurality of users.

8. The method of claim 6, further comprising:
enabling communication between the one or more computers and a plurality of users such that the plurality of users collectively access the digital asset or the digital asset data.

9. The method of claim 8, further comprising:
enabling each of the plurality of users to perform one or more of creating, purchasing, trading, combining, splitting, auctioning, or altering the digital asset.

10. The method of claim 1, further comprising:
communicating with one or more content providers or intellectual property owners for creating or altering digital asset data independently of the performance of the first and second media.

11. The method of claim 1,
wherein said receiving data comprises receiving data directly from the first one or more of the media sources; and
wherein said sending at least a second portion of the updated digital asset data comprises sending the at least at second portion of the updated digital asset data directly to the second one or more of the media sources.

12. The method of claim 1,
wherein the first media comprises a first game, and wherein the second media comprises a second game other than the first game, whereby the digital asset provides a cross game asset between the first and second games.

13. The method of claim 12, wherein the first and second games are in different respective media channels.

14. A method for managing a plurality of digital assets on one or more computers independently of a plurality of media sources including first and second media sources, the plurality of media sources performing at least different first and second media, each of the digital assets comprising one or more of a virtual character and virtual property and being represented by digital asset data, the digital asset data comprising a plurality of characteristics including at least one alterable characteristic, the method comprising:
    enabling a user to access at least a portion of the digital asset data for at least one of the plurality of digital assets independently of performing either the first media or the second media; and
    providing the accessed digital asset data to each of the first and second media sources, whereby the performance of the first and second media by the first and second media sources is affected by the accessed digital asset data.

15. The method of claim 14, wherein accessing comprises creating, purchasing, trading, combining, splitting, auctioning, altering, or viewing the portion of the digital asset data.

16. The method of claim 14, further comprising:
    enabling a plurality of users to access at least a portion of the digital asset data for at least one of the plurality of digital assets.

17. The method of claim 14, further comprising:
    determining a status of one or more of the plurality of users, wherein the status is one of a plurality of tiers; and
    selectively enabling or restricting access to digital asset data based on the determined status.

18. The method of claim 16, wherein accessing occurs via a user interface in communication with the plurality of media sources.

19. The method of claim 14, wherein accessing comprises at least one of creating the portion of the digital asset data and altering the portion of the digital asset data;
    further comprising charging a fee for accessing the portion of the digital asset data.

20. The method of claim 14, wherein accessing comprises:
    enabling the user to access a user profile associated with that user;
    wherein the user profile comprises identification of digital assets available for access by that user.

21. The method of claim 14, further comprising:
    determining a status of the user; and
    providing services and/or content to the user based on the determined status.

22. The method of claim 20, wherein the user profile further comprises data relating to the plurality of media sources.

23. The method of claim 22, wherein the data relating to the plurality of media sources comprises achievement data for either the first media or the second media.

24. The method of claim 14, wherein said providing comprises providing the digital asset data directly to each of the first and second media sources.

25. The method of claim 14, wherein the first media comprises a first game, and wherein the second media comprises a second game other than the first game, whereby the digital asset provides a cross game asset between the first and second games.

26. The method of claim 25, wherein the first and second games are in different respective media channels.

27. An apparatus for facilitating performance of different first media and second media by a plurality of media sources, the apparatus comprising:
    at least one computer networked with the plurality of media sources, the at least one computer comprising:
        a database storing a plurality of digital assets, each digital asset comprising digital asset data comprising identification information, user information, and a plurality of characteristics including alterable characteristics;
        a first interface configured to receive requests and identification information from one or more media sources, send digital asset data to one or more media sources for performing the first and second media, and receive data from one or more media sources based on performing the first and second media for altering one or more alterable characteristics;
        a processor configured to retrieve digital asset data in response to the requests and identification information for sending via the interface, and configured to alter the one or more alterable characteristics in response to the received data; and
        a second interface enabling a user to access at least a portion of the digital asset data for at least one of the plurality of digital assets independently of performing either the first media or the second media.

28. The apparatus of claim 27 further comprising:
    at least one real-world object having identification information, or information associated with the identification information, stored therein.

29. The apparatus of claim 28 further comprising:
    at least one trusted system configured to interface with the at least one real-world object and with the at least one computer.

30. The apparatus of claim 27, wherein said first interface is configured to send digital asset data directly to the one or more media sources, and to receive data directly from the one or more media sources.

31. The apparatus of claim 27, wherein the first media comprises a first game, and wherein the second media comprises a second game other than the first game, whereby the digital asset provides a cross game asset between the first and second games.

32. The apparatus of claim 31, wherein the first and second games are in different respective media channels.

* * * * *